US012277822B2

(12) United States Patent
Grant et al.

(10) Patent No.: US 12,277,822 B2
(45) **Date of Patent: *Apr. 15, 2025**

(54) MERCHANDISE DISPLAY SECURITY SYSTEMS AND METHODS

(71) Applicant: InVue Security Products Inc., Charlotte, NC (US)

(72) Inventors: Jeffrey A. Grant, Charlotte, NC (US); Jonathon D. Phillips, Fort Mill, SC (US); Christopher J. Fawcett, Charlotte, NC (US); Karen Bellum Bomber, Lake Wylie, SC (US); Larry T. McKinney, Huntersville, NC (US); William M. Warren, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,566

(22) Filed: Mar. 11, 2020

(65) Prior Publication Data

US 2020/0234522 A1 Jul. 23, 2020

Related U.S. Application Data

(63) Continuation of application No. 16/419,791, filed on May 22, 2019, now abandoned, which is a (Continued)

(51) Int. Cl.
*G05B 19/00* (2006.01)
*G07C 9/00* (2020.01)

(Continued)

(52) U.S. Cl.
CPC ........... *G07C 9/27* (2020.01); *G07C 9/00857* (2013.01); *G08B 13/1445* (2013.01); *G07C 2009/00865* (2013.01); *G07C 2009/0088* (2013.01)

(58) Field of Classification Search
CPC ............ G07C 9/00309; G07C 9/00571; G07C 9/00857; G07C 9/27; G07C 2009/00865;

(Continued)

(56) References Cited

U.S. PATENT DOCUMENTS

| | | | |
|---|---|---|---|
| 3,582,981 | A | 6/1971 | Dalyai |
| 3,953,769 | A | 4/1976 | Sopko |

(Continued)

FOREIGN PATENT DOCUMENTS

| | | | |
|---|---|---|---|
| CN | 1564208 | A | 9/2004 |
| CN | 101868810 | A | 10/2010 |

(Continued)

OTHER PUBLICATIONS

Office Action from corresponding Chinese Patent Application No. 20190891960.4, dated Nov. 25, 2020 (10 pages).

(Continued)

*Primary Examiner* — Toan N Pham
(74) *Attorney, Agent, or Firm* — InVue Security Products Inc.

(57) ABSTRACT

Merchandise security systems and methods are provided. In one example, a merchandise security system includes a plurality of electronic keys and a plurality of merchandise security devices located within a retail store. Each electronic key and each merchandise security device is configured to store one or more serial numbers. In addition, each electronic key is configured to be authorized for communication with one or more merchandise security devices within the retail store. An electronic key is configured to communicate (Continued)

with a merchandise security device for locking, unlocking, arming, and/or disarming the merchandise security device when the serial numbers match.

35 Claims, 20 Drawing Sheets

Related U.S. Application Data continuation of application No. 16/245,332, filed on Jan. 11, 2019, now Pat. No. 10,347,061, which is a continuation of application No. 16/169,664, filed on Oct. 24, 2018, now Pat. No. 10,210,681, which is a continuation of application No. 15/540,403, filed as application No. PCT/US2015/067034 on Dec. 21, 2015, now Pat. No. 10,127,745.

(60) Provisional application No. 62/197,777, filed on Jul. 28, 2015, provisional application No. 62/097,264, filed on Dec. 29, 2014.

(51) Int. Cl.
*G07C 9/27* (2020.01)
*G08B 13/14* (2006.01)

(58) Field of Classification Search
CPC ............ G07C 2009/0088; G08B 13/14; G08B 13/1445; G08B 13/1463; G08B 13/2434; G08B 25/008; G06Q 20/32; G06Q 20/327; E05B 73/0017
See application file for complete search history.

(56) References Cited

U.S. PATENT DOCUMENTS

| | | | |
|---|---|---|---|
| 4,134,108 | A | 1/1979 | Palmer et al. |
| 4,353,064 | A | 10/1982 | Stamm |
| 4,354,189 | A | 10/1982 | Lemelson |
| 4,391,204 | A | 7/1983 | Mitchell et al. |
| 4,509,093 | A | 4/1985 | Stellberger |
| 4,611,205 | A | 9/1986 | Egilse |
| 4,651,143 | A | 3/1987 | Yamanaka |
| 4,660,027 | A | 4/1987 | Davis |
| 4,709,202 | A | 11/1987 | Koenck et al. |
| 4,720,700 | A | 3/1988 | Seibold et al. |
| 4,729,056 | A | 3/1988 | Edwards et al. |
| 4,742,426 | A | 5/1988 | Lavelle |
| 4,766,746 | A | 8/1988 | Henderson et al. |
| 4,791,280 | A | 12/1988 | O'Connell et al. |
| 4,811,012 | A | 3/1989 | Rollins |
| 4,829,296 | A | 5/1989 | Clark et al. |
| 4,845,484 | A | 7/1989 | Ellsberg |
| 4,887,292 | A | 12/1989 | Barrett et al. |
| 4,926,996 | A | 5/1990 | Eglise et al. |
| 4,952,864 | A | 8/1990 | Pless et al. |
| 4,967,305 | A | 10/1990 | Murrer et al. |
| 5,014,049 | A | 5/1991 | Bosley |
| 5,021,776 | A | 6/1991 | Anderson et al. |
| 5,065,356 | A | 11/1991 | Puckette |
| 5,109,530 | A | 4/1992 | Stengel |
| 5,113,182 | A | 5/1992 | Suman et al. |
| 5,184,855 | A | 2/1993 | Waltz et al. |
| 5,265,452 | A | 11/1993 | Dawson et al. |
| 5,272,475 | A | 12/1993 | Eaton et al. |
| 5,278,547 | A | 1/1994 | Suman et al. |
| 5,280,518 | A | 1/1994 | Danler et al. |
| 5,319,362 | A | 6/1994 | Hyatt, Jr. |
| 5,347,419 | A | 9/1994 | Caron et al. |
| 5,349,345 | A | 9/1994 | Vanderschel |
| 5,438,321 | A | 8/1995 | Bernard et al. |
| 5,473,236 | A | 12/1995 | Frolov |
| 5,477,041 | A | 12/1995 | Miron et al. |
| 5,488,358 | A | 1/1996 | Hamilton et al. |
| 5,506,575 | A | 4/1996 | Ormos |
| 5,508,691 | A | 4/1996 | Castleman et al. |
| 5,559,505 | A | 9/1996 | McNair |
| 5,575,515 | A | 11/1996 | Iwamoto et al. |
| 5,602,536 | A | 2/1997 | Henderson et al. |
| 5,617,082 | A | 4/1997 | Denison et al. |
| 5,625,349 | A | 4/1997 | Disbrow et al. |
| 5,635,907 | A | 6/1997 | Bernard et al. |
| 5,673,034 | A | 9/1997 | Saliga |
| 5,748,083 | A | 5/1998 | Rietkerk |
| 5,767,792 | A | 6/1998 | Urbas et al. |
| 5,771,722 | A | 6/1998 | DiVito et al. |
| 5,774,053 | A | 6/1998 | Porter |
| 5,774,058 | A | 6/1998 | Henry et al. |
| 5,774,059 | A | 6/1998 | Henry et al. |
| 5,801,618 | A | 9/1998 | Jenkins |
| 5,893,283 | A | 4/1999 | Evans et al. |
| 5,999,095 | A | 12/1999 | Earl et al. |
| 6,002,427 | A | 12/1999 | Kipust |
| 6,005,487 | A | 12/1999 | Hyatt, Jr. et al. |
| 6,040,771 | A | 3/2000 | Kim |
| 6,076,383 | A | 6/2000 | Clark et al. |
| 6,130,602 | A | 10/2000 | O'Toole et al. |
| 6,204,764 | B1 | 3/2001 | Maloney |
| 6,211,747 | B1 | 4/2001 | Trichet et al. |
| 6,219,700 | B1 | 4/2001 | Chang et al. |
| 6,323,782 | B1 | 11/2001 | Stephens et al. |
| 6,331,812 | B1 | 12/2001 | Dawalibi |
| 6,333,574 | B1 | 12/2001 | Clark et al. |
| 6,342,830 | B1 | 1/2002 | Want et al. |
| 6,359,547 | B1 | 3/2002 | Dension et al. |
| 6,384,709 | B2 | 5/2002 | Mellen et al. |
| 6,401,059 | B1 | 6/2002 | Shen et al. |
| 6,437,740 | B1 | 8/2002 | Chamlain et al. |
| 6,472,973 | B1 | 10/2002 | Harold et al. |
| 6,483,424 | B1 | 11/2002 | Bianco |
| 6,552,650 | B1 | 4/2003 | Gokcebay et al. |
| 6,584,309 | B1 | 6/2003 | Whigham |
| 6,690,411 | B2 | 2/2004 | Naidoo et al. |
| 6,693,512 | B1 | 2/2004 | Frecska et al. |
| 6,717,517 | B2 | 4/2004 | Przygoda, Jr. |
| 6,741,160 | B1 | 5/2004 | Dawson et al. |
| 6,795,202 | B2 | 9/2004 | Emoto et al. |
| 6,867,685 | B1 | 3/2005 | Stillwagon |
| 6,882,282 | B1 | 4/2005 | Lie-Nielsen et al. |
| 6,900,720 | B2 | 5/2005 | Denison et al. |
| 6,970,183 | B1 | 11/2005 | Monroe |
| 6,977,576 | B2 | 12/2005 | Denison et al. |
| 7,002,467 | B2 | 2/2006 | Deconinck et al. |
| 7,010,501 | B1 * | 3/2006 | Roslak .................. G06Q 20/20 705/23 |
| 7,012,503 | B2 | 3/2006 | Nielsen |
| 7,015,806 | B2 | 3/2006 | Naidoo et al. |
| 7,019,615 | B2 | 3/2006 | Denison et al. |
| 7,027,808 | B2 | 4/2006 | Wesby |
| 7,042,356 | B2 | 5/2006 | Kent |
| 7,061,367 | B2 | 6/2006 | Mosgrove et al. |
| 7,170,998 | B2 | 1/2007 | McLintock et al. |
| 7,173,526 | B1 | 2/2007 | Monroe |
| 7,202,772 | B2 | 4/2007 | Emmerling et al. |
| 7,242,304 | B2 | 7/2007 | Clancy et al. |
| 7,295,100 | B2 | 11/2007 | Denison et al. |
| 7,317,387 | B1 | 1/2008 | Cova et al. |
| 7,373,352 | B2 | 5/2008 | Roatis et al. |
| 7,456,725 | B2 | 11/2008 | Denison et al. |
| 7,482,907 | B2 | 1/2009 | Denison et al. |
| 7,495,543 | B2 | 2/2009 | Denison et al. |
| 7,591,422 | B2 | 9/2009 | Maitin |
| 7,606,558 | B2 | 10/2009 | Despain et al. |
| 7,671,741 | B2 | 3/2010 | Lax et al. |
| 7,683,758 | B2 | 3/2010 | Denison et al. |
| 7,737,845 | B2 * | 6/2010 | Fawcett ............. G07C 9/00309 340/815.45 |
| 7,741,952 | B2 | 6/2010 | Denison et al. |
| 7,821,395 | B2 | 10/2010 | Denison et al. |
| 7,880,584 | B2 | 2/2011 | Larson et al. |
| 8,058,971 | B2 | 11/2011 | Harkins et al. |
| 8,077,037 | B2 | 12/2011 | Leyden et al. |

(56) References Cited

U.S. PATENT DOCUMENTS 8,144,014 B1 3/2012 Yang
8,310,365 B2 11/2012 Siegler, II et al.
8,335,488 B2 12/2012 Despain et al.
8,368,507 B2 2/2013 Conreux et al.
8,378,826 B2 2/2013 Mercier et al.
8,437,740 B2 5/2013 Despain et al.
8,497,200 B2 7/2013 Matejat et al.
8,520,068 B2 8/2013 Naidoo et al.
8,542,119 B2 9/2013 Sankey
8,587,405 B2 11/2013 Denison et al.
8,613,107 B2 12/2013 Peckover
8,643,487 B2 2/2014 Roatis et al.
8,756,431 B1 6/2014 Despain et al.
8,786,400 B2 7/2014 Harkins et al.
8,910,863 B2 12/2014 Wojcik et al.
8,922,333 B1 12/2014 Kirkjan
8,928,463 B2 1/2015 Landau et al.
8,941,467 B2 1/2015 Jankowski et al.
9,443,404 B2 9/2016 Grant et al.
9,786,140 B2 10/2017 Henson et al.
9,811,988 B2 11/2017 Grant et al.
10,078,945 B2 9/2018 Grant et al.
10,127,745 B2 11/2018 Grant et al.
10,210,681 B1 2/2019 Grant et al.
10,258,172 B2 4/2019 Grant et al.
10,269,202 B2 4/2019 Denison
10,290,192 B2 5/2019 Grant et al.
10,347,061 B2 7/2019 Grant et al.
10,475,308 B2 11/2019 Grant et al.
10,529,201 B2 11/2020 Grant et al.
10,827,854 B2 11/2020 Grant et al.
11,037,417 B2 6/2021 Grant et al.
11,230,862 B2 1/2022 Grant et al.
11,253,087 B2 2/2022 Grant et al.
11,702,867 B2 7/2023 Grant et al.
11,741,800 B2 8/2023 Grant et al.
2001/0000430 A1 4/2001 Smith et al.
2002/0063157 A1 5/2002 Hara
2002/0089434 A1 7/2002 Ghazarian
2002/0133716 A1 9/2002 Harif
2003/0025599 A1 2/2003 Monroe
2004/0003257 A1 1/2004 Mitchell
2004/0025039 A1 2/2004 Kuenzi et al.
2004/0039919 A1 2/2004 Takayama et al.
2004/0160305 A1 8/2004 Remenih et al.
2004/0174264 A1 9/2004 Reisman et al.
2004/0207509 A1 10/2004 Mlynarczyk et al.
2005/0017906 A1 1/2005 Man et al.
2005/0088279 A1 4/2005 Denison et al.
2005/0184857 A1 8/2005 Roatis et al.
2005/0285716 A1 12/2005 Denison et al.
2006/0038654 A1 2/2006 Khalil
2006/0047692 A1 3/2006 Rosenblum et al.
2007/0096866 A1 5/2007 Denison et al.
2007/0096867 A1 5/2007 Denison et al.
2007/0131005 A1 6/2007 Clare
2007/0144224 A1 6/2007 Scott et al.
2007/0146134 A1 6/2007 Belden et al.
2007/0159328 A1 7/2007 Belden et al.
2007/0296545 A1 12/2007 Clare
2008/0074235 A1 3/2008 Wong et al.
2008/0204239 A1 8/2008 Marszalek et al.
2009/0051486 A1 2/2009 Denison et al.
2009/0198529 A1 8/2009 Burkholder et al.
2009/0249846 A1 10/2009 Gokcebay
2010/0148932 A1 6/2010 Oakes
2010/0175438 A1 7/2010 Sankey
2010/0238031 A1 9/2010 Belden, Jr. et al.
2010/0300159 A1 12/2010 Berg et al.
2011/0025459 A1 2/2011 Denison et al.
2011/0050390 A1 3/2011 Denison et al.
2011/0082882 A1 4/2011 Denison et al.
2011/0084840 A1* 4/2011 Mercier .................. G07C 9/28
340/572.1
2011/0087370 A1 4/2011 Denison et al.
2011/0145739 A1* 6/2011 Berger .................. G06F 40/174
715/763
2011/0210818 A1 9/2011 Denison et al.
2011/0254661 A1 10/2011 Fawcett et al.
2011/0276609 A1 11/2011 Denison
2011/0289123 A1 11/2011 Denison
2011/0289124 A1 11/2011 Denison
2011/0309934 A1 12/2011 Henson et al.
2012/0011366 A1 1/2012 Denison
2012/0011367 A1 1/2012 Denison
2012/0047972 A1 3/2012 Grant et al.
2012/0119910 A1* 5/2012 Belden, Jr. ......... G08B 13/1445
340/568.8
2012/0180123 A1 7/2012 Kuenzi et al.
2012/0280810 A1 11/2012 Wheeler
2013/0000366 A1 1/2013 Martel et al.
2013/0027177 A1 1/2013 Denison
2013/0125231 A1 5/2013 Kuenzi
2013/0238516 A1 9/2013 Moock et al.
2013/0268316 A1 10/2013 Moock et al.
2014/0028438 A1 1/2014 Kuenzi
2014/0225733 A1 8/2014 Fawcett et al.
2014/0253331 A1 9/2014 Fawcett et al.
2014/0266669 A1 9/2014 Fadell et al.
2014/0340194 A1 11/2014 Roatis et al.
2015/0028993 A1 1/2015 Dyk et al.
2015/0029022 A1 1/2015 Stebbins
2015/0073947 A1* 3/2015 Higgins ............... G06Q 10/087
705/28
2016/0222699 A1 8/2016 Grant et al.
2016/0307209 A1 10/2016 Marszalek
2016/0308952 A1 10/2016 Marszalek et al.
2016/0335859 A1 11/2016 Sankey
2017/0164314 A1 6/2017 Wylie et al.
2017/0193780 A1 7/2017 Moock et al.
2017/0372543 A1 12/2017 Grant et al.
2018/0007648 A1 1/2018 Wylie et al.
2018/0035827 A1 2/2018 Grant et al.
2018/0288720 A1 10/2018 Blaser et al.
2018/0288721 A1 10/2018 Blaser et al.
2018/0288722 A1 10/2018 Blaser et al.
2018/0365948 A1 12/2018 Grant et al.
2019/0003209 A1 1/2019 Grant et al.
2019/0208926 A1 7/2019 Grant et al.
2019/0272689 A1 9/2019 Grant et al.
2020/0270910 A1 8/2020 Grant et al.
2022/0167760 A1 6/2022 Grant et al.
2023/0313567 A1 10/2023 Grant et al.
2023/0360505 A1 11/2023 Grant et al.

FOREIGN PATENT DOCUMENTS

CN 102257542 A 11/2011
CN 103098104 A 8/2013
EP 0160093 8/1991
EP 0193537 B1 4/1992
EP 0536286 B1 9/1999
EP 0663497 B1 9/1999
EP 0851080 B1 9/2004
FR 2519058 A1 7/1983
FR 2801334 A1 5/2001
JP 2606317 B2 4/1997
JP 2008-021321 A 1/2008
WO 199623122 A1 8/1996
WO 2000013849 A1 3/2000
WO 2000074306 A2 5/2000
WO 2000049589 A1 8/2000
WO 2001042598 A1 6/2001
WO 2014153452 A1 9/2014
WO 2015/112336 A1 7/2015

OTHER PUBLICATIONS

"Self-powered electronic lock". Energy Harvesting Journal. Feb. 3, 2011. 2 pages.

International Search Report and Written Opinion from corresponding International Application No. PCT/US/2015/067034, dated Mar. 4, 2016 (9 pages).

(56) References Cited

OTHER PUBLICATIONS

Office Action from corresponding Japanese Patent Application No. 2017-553046, dated Aug. 20, 2018 (3 pages).
Extended European Search Report from corresponding European Patent Application No. 15876009.0, dated Aug. 13, 2018 (9 pages).
First Office Action from corresponding Chinese Patent Application No. 201580076104.3, dated Nov. 20, 2018 (10 pages).
U.S. Appl. No. 16/733,953, filed Jan. 3, 2020.
Summons to Attend Oral Proceedings from corresponding European Patent Application No. 15876009.0, dated Jan. 17, 2024.

* cited by examiner

MERCHANDISE DISPLAY SECURITY SYSTEMS AND METHODS

CROSS REFERENCE TO RELATED APPLICATIONS

This application is a continuation of U.S. application Ser. No. 16/419,791, filed on May 22, 2019, now abandoned, which is a continuation of U.S. application Ser. No. 16/245,332, filed on Jan. 11, 2019, and now U.S. Pat. No. 10,347,061, which is a continuation of U.S. application Ser. No. 16/169,664, filed on Oct. 24, 2018, and now U.S. Pat. No. 10,210,681, which is a continuation of U.S. application Ser. No. 15/540,403, filed on Jun. 28, 2017, now U.S. Pat. No. 10,127,745, which is a 371 national phase entry of International Application No. PCT/US2015/067034, filed Dec. 21, 2015, which claims the benefit of the filing dates of U.S. Provisional Application No. 62/097,264 filed on Dec. 29, 2014, and United States Provisional Application No. 62/197,777 filed on Jul. 28, 2015, the disclosures of which are incorporated herein by reference in their entireties.

FIELD OF THE INVENTION

The present invention relates generally to merchandise display security systems and methods for protecting items of merchandise from theft.

BACKGROUND OF THE INVENTION

It is common practice for retailers to display relatively small, relatively expensive items of merchandise on a security device, such as a display hook or a display fixture, within security packaging commonly referred to as a "safer", or otherwise on a display surface. The security device or safer displays an item of merchandise so that a potential purchaser may examine the item when deciding whether to purchase the item. The small size and relative expense of the item, however, makes the item an attractive target for shoplifters. A shoplifter may attempt to detach the item from the security device, or alternatively, may attempt to remove the security device from the display area along with the merchandise. Items of merchandise may also be secured using a display stand to allow users to sample the item for potential purchase. In some instances, the security device is secured to a display support using a lock operated by a key, for example, a mechanical lock. In other instances, the security device is secured to the display support using a lock operated by an electronic key to arm and disarm the security device.

BRIEF SUMMARY

Embodiments of the present invention are directed to merchandise security system and methods for protecting an item of merchandise susceptible to theft. In one example, a merchandise security system includes a plurality of merchandise security devices located within a retail store, wherein each merchandise security device has at least one serial number. The security system also includes a plurality of electronic keys, wherein each electronic key is configured to store at least one of the serial numbers. At least one of the electronic keys is configured to be authorized for locking, unlocking, arming, and/or disarming one or more merchandise security devices within the retail store. One of the electronic keys is configured to communicate with a merchandise security device for locking, unlocking, arming, and/or disarming the merchandise security device in response to the serial number stored by the electronic key matching the serial number of the merchandise security device.

In another embodiment, a method for protecting an item of merchandise susceptible to theft is provided. The method includes providing a plurality of merchandise security devices located within a retail store, wherein each merchandise security device has at least one serial number. The method also includes authorizing at least one of a plurality of electronic keys to communicate with one or more different merchandise security devices than at least one other electronic key within the retail store and programming one or more of the serial numbers in each of the plurality of electronic keys. In addition, the method includes initiating communication with one of the merchandise security devices via one of the electronic keys for locking, unlocking, arming, and/or disarming the merchandise security device in response to the serial number of the electronic key matching the serial number of the merchandise security device.

According to one embodiment, a merchandise security system includes a plurality of merchandise security devices located within a retail store, wherein each merchandise security device has at least one serial number. The security system also includes a plurality of electronic keys, wherein each electronic key is configured to store a plurality of the serial numbers. One of the electronic keys is configured to communicate with one of the merchandise security devices for locking, unlocking, arming, and/or disarming the merchandise security device in response to one of the serial numbers stored by the electronic key matching the serial number of the merchandise security device.

In another embodiment, a method for protecting an item of merchandise susceptible to theft is provided. The method includes storing one or more serial numbers in a plurality of merchandise security devices located within a retail store and storing one or more of the serial numbers in a first plurality of electronic keys. The method further includes storing one or more of the serial numbers in a second plurality of electronic keys, wherein the serial numbers stored by the first plurality of electronic keys are different than the second plurality of electronic keys. Moreover, the method includes communicating with one of the merchandise security devices via one of the electronic keys for locking, unlocking, arming, and/or disarming the merchandise security device in response to one of the serial numbers of the electronic key matching the serial number of the merchandise security device.

In another embodiment, a merchandise security system includes a plurality of merchandise security devices located within a retail store, wherein each merchandise security device is configured to store at least one security code and at least one serial number. The security system also includes a plurality of electronic keys, wherein each electronic key is configured to store at least one security code and at least one of the serial numbers. Each of the electronic keys is configured to be authorized for locking, unlocking, arming, and/or disarming one or more of the merchandise security devices within the retail store when a serial number of one of the electronic keys matches a serial number of one of the merchandise security devices. Furthermore, an electronic key is configured to communicate with the merchandise security device for locking, unlocking, arming, and/or disarming the merchandise security device in response to the security code of the electronic key matching the security code of the merchandise security device.

DETAILED DESCRIPTION OF EMBODIMENTS OF THE INVENTION

Figure 1:
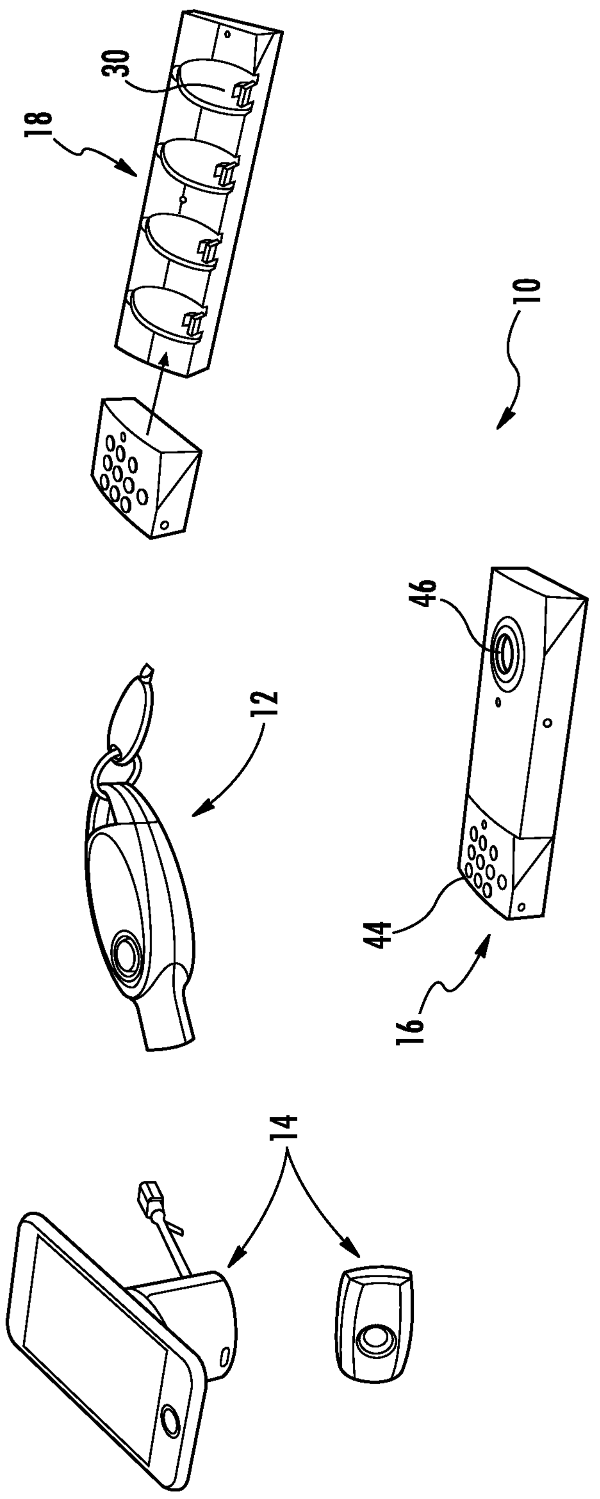
FIG. 1 illustrates a merchandise security system according to one embodiment of the present invention.

Referring now to the accompanying drawing figures wherein like reference numerals denote like elements throughout the various views, one or more embodiments of a merchandise display security system are shown. In the embodiments shown and described herein, the system includes an electronic key and a merchandise security device. Merchandise security devices suitable for use with the electronic keys include, but are not limited to, a security display (e.g. alarming stand), security fixture (e.g. locking hook, shelf, cabinet, etc.) or security packaging (e.g. merchandise keeper) for an item of merchandise. However, an electronic key (also referred to herein as a programmable key or generally as a key) may be useable with any security device or locking device that utilizes power transferred from the key to operate a mechanical and/or electronic lock mechanism and/or utilizes data transferred from the key to authorize the operation of a lock mechanism and/or arming or disarming an alarm circuit. In other words, an electronic key is useable with any security device or locking device that requires power transferred from the key to the device and/or data transferred from the key to the device. Further examples of security devices and locking devices include, but are not limited to, a door lock, a drawer lock or a shelf lock, as well as any device that prevents an unauthorized person from accessing, removing or detaching an item from a secure location or position. Although the following discussion relates to a system for use in a retail store, it is understood that the system is also suitable for other industries, such as hospital, restaurants, etc. In some embodiments, the merchandise security device and the electronic key are similar to those disclosed in U.S. application Ser. No. 13/222,225 filed on Aug. 31, 2011, entitled Electronic Key for Merchandise Security Device, the disclosure of which is incorporated herein by reference in its entirety.

Figure 2:
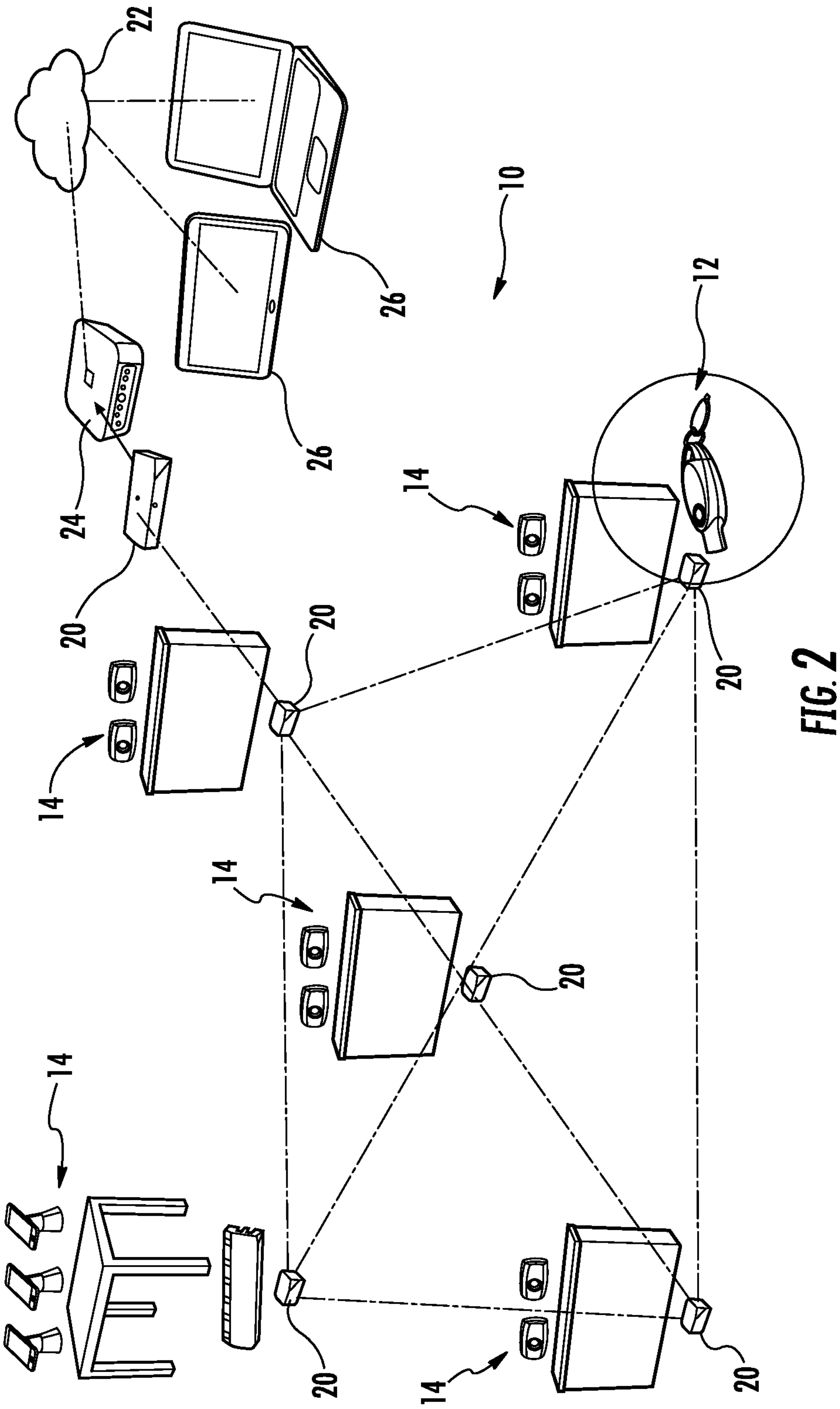
FIG. 2 illustrates a merchandise security system according to another embodiment of the present invention.

FIG. 1 illustrates one embodiment of a system 10. In this embodiment, the system generally includes an electronic key 12, one or more merchandise security devices 14, a programming or authorization station 16, and a charging station 18. FIG. 2 shows an embodiment of a system 10 that is part of a network of merchandise security devices. According to some embodiments, the network enables communication between a plurality of electronic keys and merchandise security devices. The network may be cloud-based and include a cloud 22 for receiving data from, and/or providing data to, the electronic keys and/or merchandise security devices. The cloud 22 may facilitate data transfer to one or more remote locations or devices 26 (e.g., a tablet or computer) where the data may be reviewed and analyzed. The network may be a mesh network including a plurality of nodes 20 that are configured to communicate with one another, one or more electronic keys 12, and/or one or more merchandise security devices 14. The nodes 20 and/or security devices 14 may be located within one or more zones. A gateway 24 may be employed to allow for communication between the one or more nodes 20 and the cloud 22. In some embodiments, all communication within the network is wireless, such as via radio-frequency signals (e.g., Sub GHz ISM band or 2.4 GHz), although other types of wireless communication may be possible.

Figure 3:
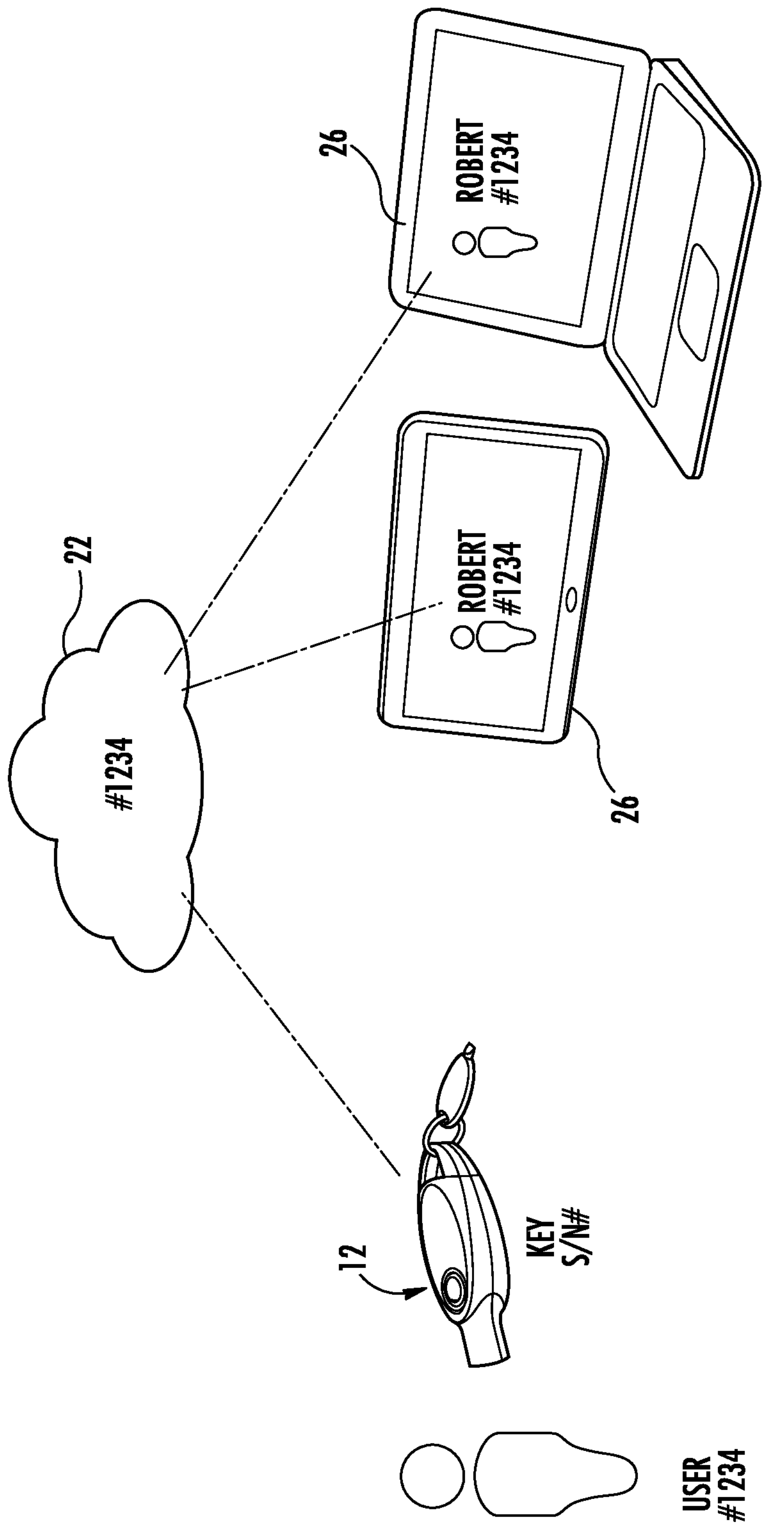
FIG. 3 illustrates a key in communication with a remote device via a cloud according to one embodiment.

In some embodiments, each electronic key 12 is configured to store various types of data. For example, each key 12 may store a serial number of one or more merchandise security devices 14, the data and time of activation of the key, a user of the key, a serial number of the key, a department number within a retail store, number of key activations, a type of activation (e.g., "naked" activation, activation transferring only data, activation transferring power, activation transferring data and power), and/or various events (e.g., a merchandise security device has been locked, unlocked, armed, or disarmed). For instance, FIG. 3 shows that the identity of a user of an electronic key 12 may be communicated to a remote location or device 26. This information may be transmitted to the remote location or device 26 upon each activation of the key 12 or at any other desired period of time, such as upon communication with a programming or authorization station 16. Thus, the data transfer may occur in real time or automatically in some embodiments. In some cases, the programming station 16 may be configured to store the data and transfer the data to a remote location or device 26. Authorized personnel may use this data to take various actions, such as to audit and monitor associate activity, determine the battery life of a key 12, audit merchandise security devices 14 (e.g., ensure the security devices are locked or armed), etc. Moreover, such information may be requested and obtained on demand, such as from the programming station 16.

In some cases, the data may include battery analytics of an electronic key 12. For example, the battery analytics may include monitoring the battery voltage of an electronic key 12 when the key is placed on a charging station 18 and the time taken to reach full charge. These values may be used to determine depth of discharge. The battery analytics may be indicative of a battery that is nearing its end of life. A retailer or other authorized personnel may take various actions using this information, such as replacing the key or disabling the key to prevent battery swelling and housing failure.

In one embodiment, the electronic key 12 is configured to obtain data from a merchandise security device 14 (e.g., a security fixture). For example, the merchandise security device 14 may store various data regarding past communication with a previous electronic key 12 (e.g., key identification, time of communication, etc.), and when a subsequent electronic key communicates with the same merchandise security device, the data is transferred to the electronic key. Thus, the merchandise security device 14 may include a memory for storing such data. In some cases, the merchandise security device 14 includes a power source for receiving and storing the data, while in other cases, the power provided by the electronic key 12 is used for allowing the merchandise security device to store the data. The electronic key 12 may then communicate the data for collection and review, such as at a remote location or device 26. In some instances, communication between the electronic key 12 and the programming or authorization station 16 may allow data to be pulled from the electronic key and communicated, such as to a remote location or device 26. In other cases, the electronic key 12 may be configured to obtain data from merchandise security devices 14 (e.g., a security display), such as an identification of the merchandise security device, the type of item of merchandise on display, an identification of the item of merchandise, and/or the system health of the security device and/or the item of merchandise. The electronic key 12 may store the data and provide the data to a remote location or device 26 upon communication with the programming or authorization station 16. As such, the electronic keys 12 may be a useful resource for obtaining various types of data from the merchandise security devices 14 without the need for wired connections or complex wireless networks or systems.

Figure 4:
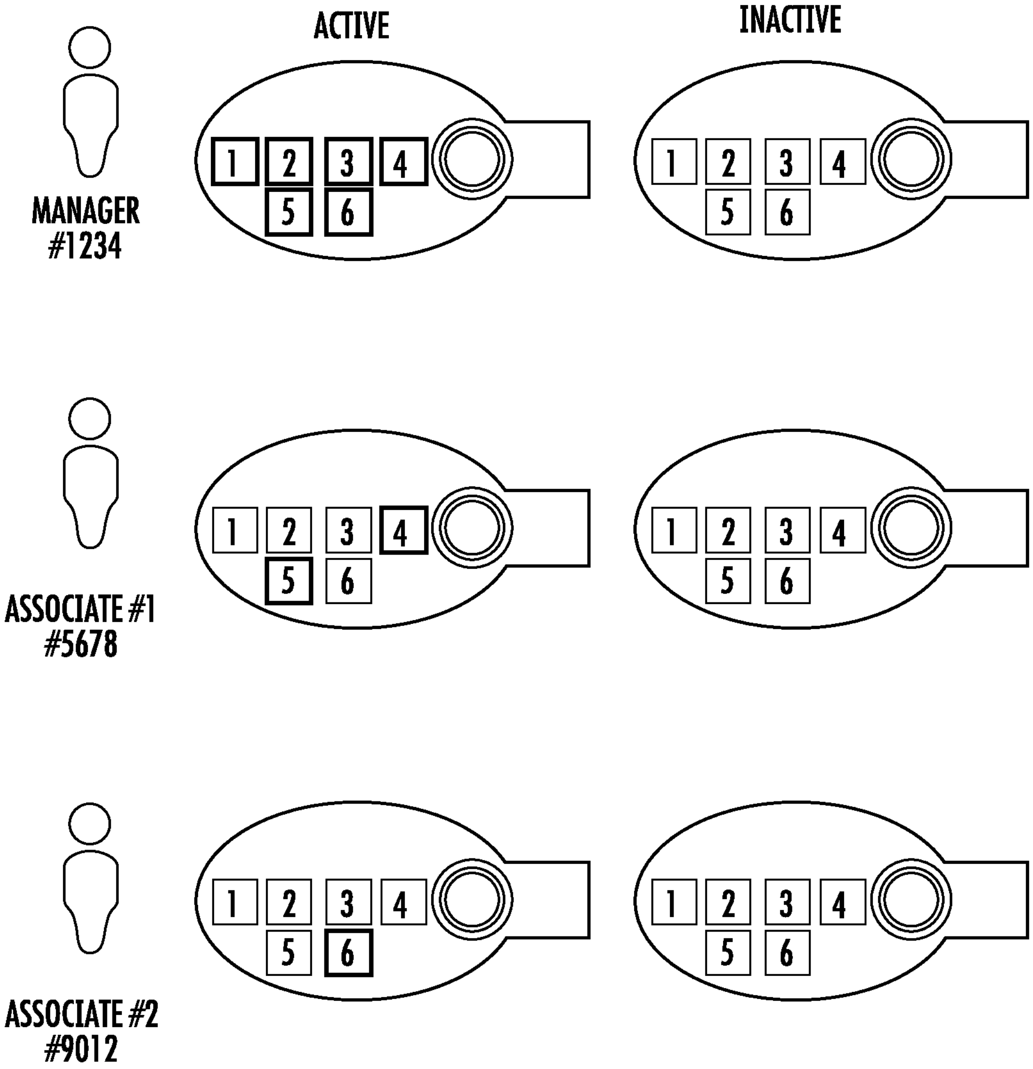
FIG. 4 illustrates a plurality of keys with different authorization levels according to one embodiment.

In some cases, each electronic key 12 may be authorized for specific locations, departments, or merchandise security devices. For instance, FIG. 4 shows that a manager may have authorization for all zones, locations, departments, or merchandise security devices (indicated as numbers 1-6), while a first associate may only have authorization for two zones, locations, departments, or merchandise security devices (indicated as numbers 4 and 5), and a second associate may only have authorization for one zone, location, department, or merchandise security device (indicated as number 6). As such, a retail store or other establishment may limit the scope of authorization for different associates within the same retail store. In order to accommodate different authorizations levels, each key 12 may be configured to store a code that is associated with each zone, location, department, or merchandise security device. For example, each zone may include a plurality of merchandise security devices 14, and a retail store may have multiple zones (e.g., a zone for electronics, a zone for jewelry, etc.).

Various techniques may be used to initially program the electronic key 12. For example, the electronic key 12 may be initially presented to each authorized merchandise security device 14. Upon communication with the security device 14 or the cloud 22, the electronic key 12 will be paired with each security device. A programming station 16 may provide a code to the electronic key 12, and the key or cloud 22 may then communicate the code to each of its authorized security devices 14. Each key 12 may only need to be programmed once. In some embodiments, a programming station 16 may be located within each zone, and a key 12 may receive a code from each programming station that it is authorized. Thereafter, each key 12 may need to be "refreshed" at the programming station 16 or a charging station 18 following a predetermined period of time. In other embodiments, the electronic key 12 may be programmed directly via the cloud 22.

Figure 19:
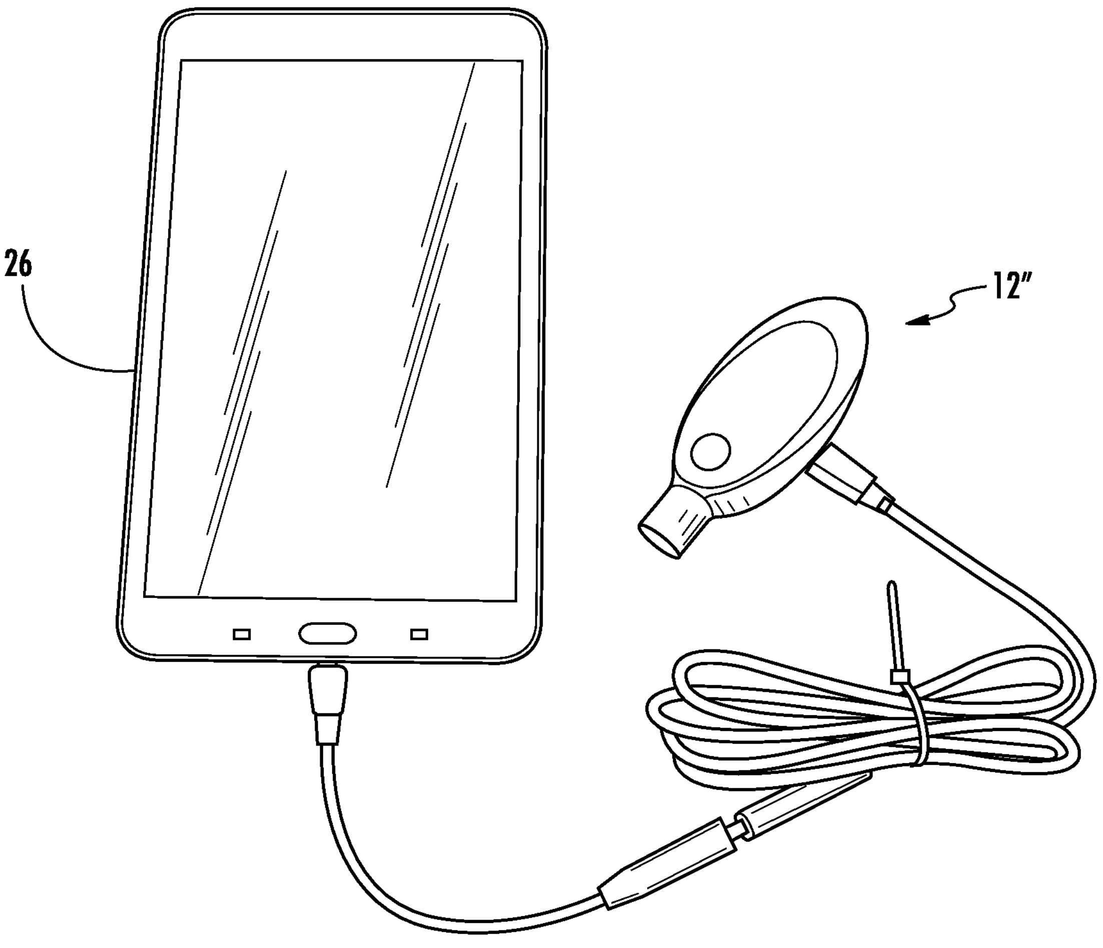
FIG. 19 illustrates an electronic key in communication with a computing device according to one embodiment.

In another embodiment, each electronic key 12 may include a security code and a serial number for one or more merchandise security devices 14. For example, a key 12 may only be able to arm, disarm, lock, or unlock a merchandise security device 14 where the security codes and the serial numbers match one another. In one example, each serial number is unique to a merchandise security device 14 and could be programmed at the time of manufacture or by the retailer. This technique allows for greater flexibility in programming keys 12 and assigning keys to particular merchandise security devices 14 and/or zones. In one embodiment, a setup electronic key 12" may be used to initially map particular merchandise security devices 14 and serial numbers. In this regard, the setup key 12" may be used to communicate with each key 12 and obtain the serial number of each merchandise security device 14. The setup key 12" may also obtain a location of the security devices 14, or a user of the setup key may provide a description for each merchandise security device (e.g., SN #123=merchandise security device #1). The setup key 12" may communicate with a tablet or other computing device 26 for accumulating all of the information (see, e.g., FIGS. 3 and 19), which may occur via wired or wireless communication. Thus, the tablet or computing device 26 may map each of the serial numbers with the merchandise security devices 14 and in some cases, may also include serial numbers and corresponding electronic keys 12. Individual electronic keys 12 may then be assigned particular serial numbers for authorized merchandise security devices 14 (e.g., user 1 includes serial numbers 1, 2, 3; user 2 includes serial numbers 1, 4, 5). Each of the electronic keys 12 may be programmed with the same security code using a programming station 16. In some embodiments, the setup process may be used in conjunction with a planogram of the merchandise security devices 14. The planogram may represent a layout of the merchandise security devices 14 within a retail store or other establishment. For example, a setup key 12" may be used to map serial numbers to specific merchandise security devices 14 on a planogram as the setup key communicates with each merchandise security device. The setup key 12" may communicate with a tablet or other computing device 26 for populating the planogram with serial numbers, such as via a wired connection (see, e.g., FIG. 19). This planogram may be uploaded to a remote location or device for managing the planogram. As before, particular serial numbers may be assigned to authorized users.

In order to arm, disarm, lock, or unlock a merchandise security device 14, the electronic key 12 may communicate with a particular merchandise security device and determine whether the security codes and the serial numbers match. If the codes match, the electronic key 12 then arms, disarms, locks, or unlocks the merchandise security device 14. Upon refreshing an electronic key 12 and/or when a user requests an electronic key via programming or authorization station 16, any available electronic key may be used since the key may be programmed in real time with the appropriate level of authorization for that user (e.g., specific zones, departments, and/or merchandise security devices).

In one embodiment, the merchandise display security system 10 comprises an electronic key 12 and a merchandise security device 14 that is configured to be operated by the key. The system may further comprise an optional programming station 16 that is operable for programming the key 12 with a security code, which may also be referred to herein as a Security Disarm Code (SDC). In addition to programming station 16, the system may further comprise an optional charging station 18 that is operable for initially charging and/or subsequently recharging a power source disposed within the key 12. For example, the key 12 and merchandise security device 14 may each be programmed with the same SDC into a respective permanent memory. The key 12 may be provisioned with a single-use (i.e., non-rechargeable) power source, such as a conventional or extended-life battery, or alternatively, the key may be provisioned with a multiple-use (i.e. rechargeable) power source, such as a conventional capacitor or rechargeable battery. In either instance, the power source may be permanent, semi-permanent (i.e., replaceable), or rechargeable, as desired. In the latter instance, charging station 18 is provided to initially charge and/or to subsequently recharge the power source provided within the key 12. Furthermore, key 12 and/or merchandise security device 14 may be provided with only a transient memory, such that the SDC must be programmed (or reprogrammed) at predetermined time intervals. In this instance, programming station 16 is provided to initially program and/or to subsequently reprogram the SDC into the key 12. As will be described, key 12 may be operable to initially program and/or to subsequently reprogram the merchandise security device 14 with the SDC. Key 12 is then further operable to operate the merchandise security device 14 by transferring power and/or data to the device, as will be described.

In the exemplary embodiment of the system illustrated in FIGS. 1-2, electronic key 12 is configured to be programmed with a unique SDC by the programming station 16. In some embodiments, the key 12 is presented to the programming station 16 and communication therebetween is initiated, for example, by pressing or otherwise actuating a control button 28 provided on the exterior of the key. Communication between the programming station 16 and the key 12 may be accomplished directly, for example by one or more electrical contacts, or indirectly, for example by wireless communication. Any form of wireless communication capable of transferring data between the programming station 16 and key 12 is also possible, including without limitation optical transmission, acoustic transmission or magnetic induction. In some embodiments shown and described herein, communication between programming station 16 and key 12 is accomplished by wireless optical transmission, and more particularly, by cooperating infrared (IR) transceivers provided in the programming station and the key. In some embodiments, the programming station 16 may function similarly to that disclosed in U.S. Pat. No. 7,737,844 entitled PROGRAMMING STATION FOR A SECURITY SYSTEM FOR PROTECTING MERCHANDISE, the disclosure of which is incorporated herein by reference in its entirety. For the purpose of describing some embodiments of the present invention, it is sufficient that the programming station comprises at least a logic control circuit for generating or being provided with a SDC, a memory for storing the SDC, and a communications system suitable for interacting with the electronic key 12 in the manner described herein to program the key with the SDC.

An available feature of a merchandise security system 10 according to one embodiment is that the electronic key 12 may include a time-out function. More particularly, the ability of the key 12 to transfer data and/or power to the merchandise security device 14 may be deactivated after a predetermined time period. By way of example, the electronic key 12 may be deactivated after about six to about twenty-four hours from the time the key was programmed or last refreshed. In this manner, an authorized sales associate typically must program or refresh the key 12 assigned to him at the beginning of each work shift. Furthermore, the charging station 18 may be configured to deactivate the electronic key 12 when the key is positioned within or otherwise engaged with a charging port 30 (see, e.g., FIG. 1). In this manner, the charging station 18 can be made available to an authorized sales associate. In one embodiment, the electronic key 12 may be authorized upon the sales associate inputting an authorized code to release the key for use. For instance, the sales associate may input a code on a keypad in communication with the charging station 18. Upon inputting the correct code, the charging station 18 may indicate which key 12 is authorized for use by the sales associate (e.g., via an audible and/or a visible indicator). In some cases, the time-out period may be predetermined or customized by a user. For example, a manager of a retail store may input a particular time period for one or more of the electronic keys 12. Those electronic keys 12 that are "active" may be monitored via communication within the cloud-based network. In other embodiments, the electronic key 12 may be timed out or otherwise disabled in response to an event. For instance, the electronic key 12 may be disabled in response to the key being misplaced or stolen, or keys being brought into a retail store that are not authorized for use. Such disabling may occur via a command sent to the electronic key 12 via the cloud 22.

In one embodiment, commands may be provided remotely for taking various actions. For example, where a theft has occurred, a command may be provided from a remote location or device 26 (e.g., a tablet or computer) to lock and/or arm all or a portion of the merchandise security devices 14. Similarly, a command may be provided from a remote location or device 26 to deactivate all or a portion of the electronic keys 12. As such, the system 10 provides techniques for centralized security and control of the electronic keys 12, merchandise security devices 14, and other components within the system.

Figure 5:
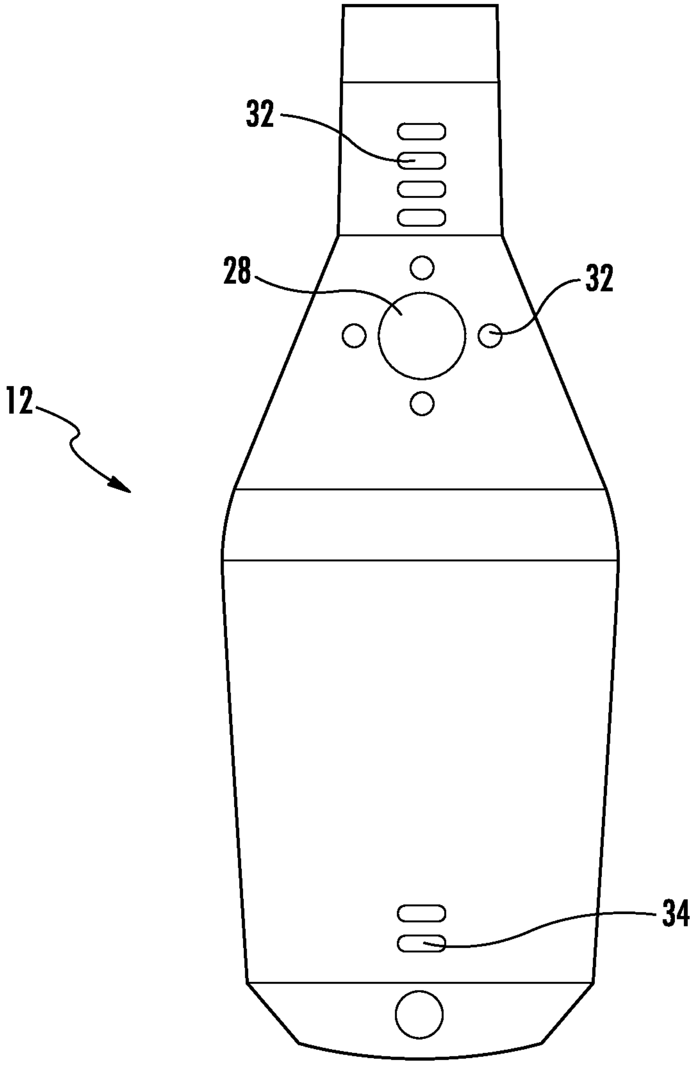
FIG. 5 is a plan view of an electronic key according to one embodiment.
Figure 6:
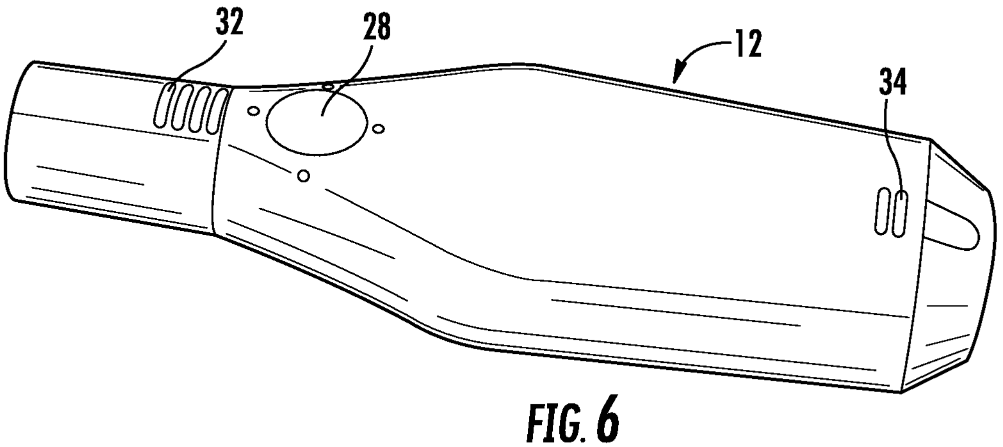
FIG. 6 is a perspective view of the electronic key shown in FIG. 5.

FIGS. 5-6 illustrate one embodiment of an electronic key 12. The electronic key 12 may include a control button 28 for activating the key, such as for initiating communication with a merchandise security device. Moreover, the electronic key 12 may also include one or more visual indicators. In this regard, the key 12 may include one or more status indicators 32 that illustrate a status of the communication of the key with a merchandise security device 14. The status indicators 32 may guide the user to know when communication between the key 12 and the merchandise security device 14 is taking place and has been completed. The status indicators 32 may be different depending on whether the communication was authorized (e.g., unlocked or disarmed), unauthorized (e.g., wrong zone or department), or unsuccessful. The status indicators 32 may also indicate an amount of time of authorized use remaining on the key 12, such as where the key includes a time-out feature as discussed above. The electronic key 12 may also include one or more other indicators 34 that provide a visual indication of the power remaining on the key. These other indicators 34 may also be used for any other desired purpose, such as to indicate a programming state of the key 12. For example, the indicators 34 may be activated while the electronic key 12 is being initially programmed. It is understood that the illustrated status indicators 32, 34 are for illustration only, as various types and configurations of indicators may be employed in alternative embodiments.

Figure 7:
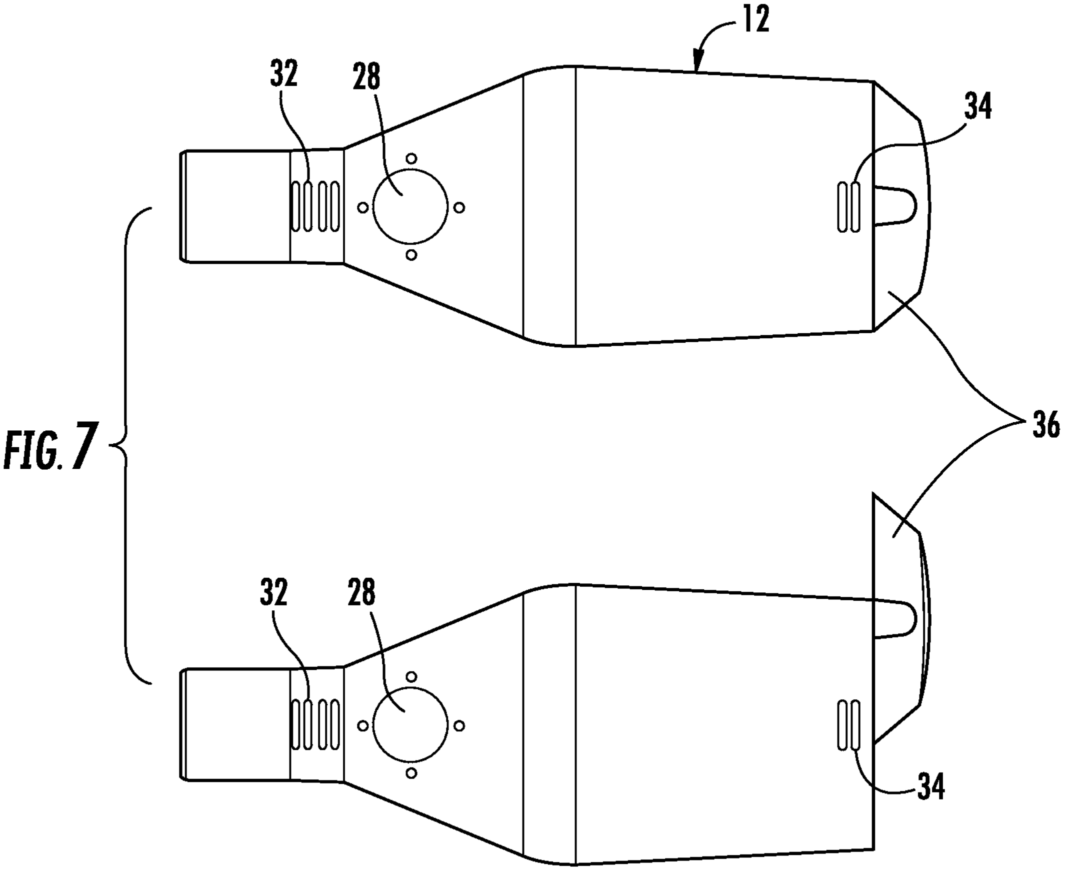
FIG. 7 is a plan view of an electronic key according to another embodiment.
Figure 8:
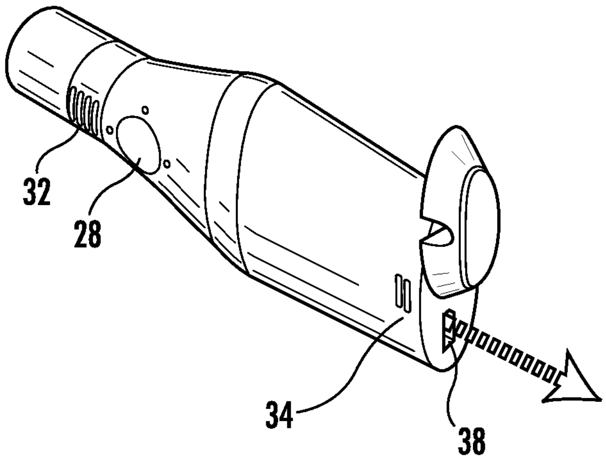
FIG. 8 is a perspective view of the electronic key shown in FIG. 7.
Figure 9:
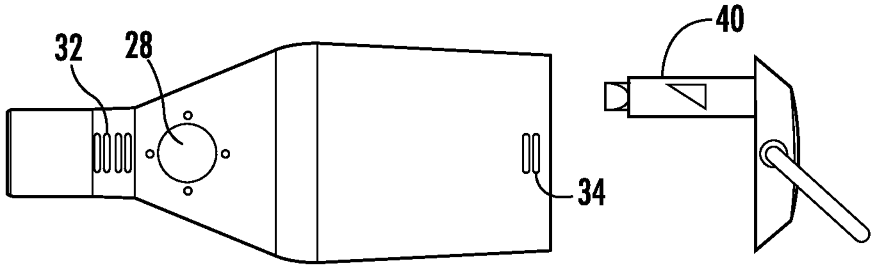
FIG. 9 is a plan view of an electronic key according to another embodiment.
Figure 10:
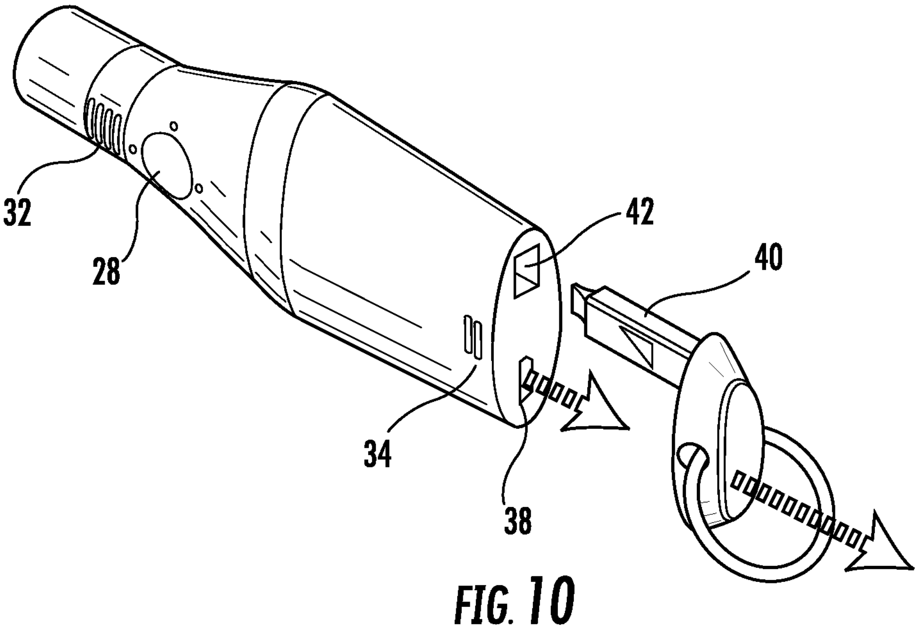
FIG. 10 is a perspective view of the electronic key shown in FIG. 9.

FIGS. 7-10 illustrate additional embodiments of electronic keys 12. In these examples, the electronic key 12 includes a removable portion 36. In FIGS. 7-8, the removable portion 36 allows access to an input power port 38, such as for recharging the electronic key 12. The removable portion 36 may be configured to slide relative to the electronic key 12 to expose the input power port 38. The input port 38 may be configured to receive and electrically connect to a corresponding connector, such as a connector associated with the charging station 18. For instance, the electronic key 12 may be configured to be docked within the charging station 18 for charging thereof (see, e.g., FIG. 1). As shown in FIGS. 9-10, the removable portion 36 may also be configured to be removed entirely from the electronic key 12 and may be multi-purpose in that it may be include a tool portion 40. For example, the tool portion 40 may be used for facilitating the disconnection of various connectors, as a screwdriver, etc. The electronic key 12 may include an opening 42 defined to receive the removable portion 36 therein in a non-use position.

Figure 20:
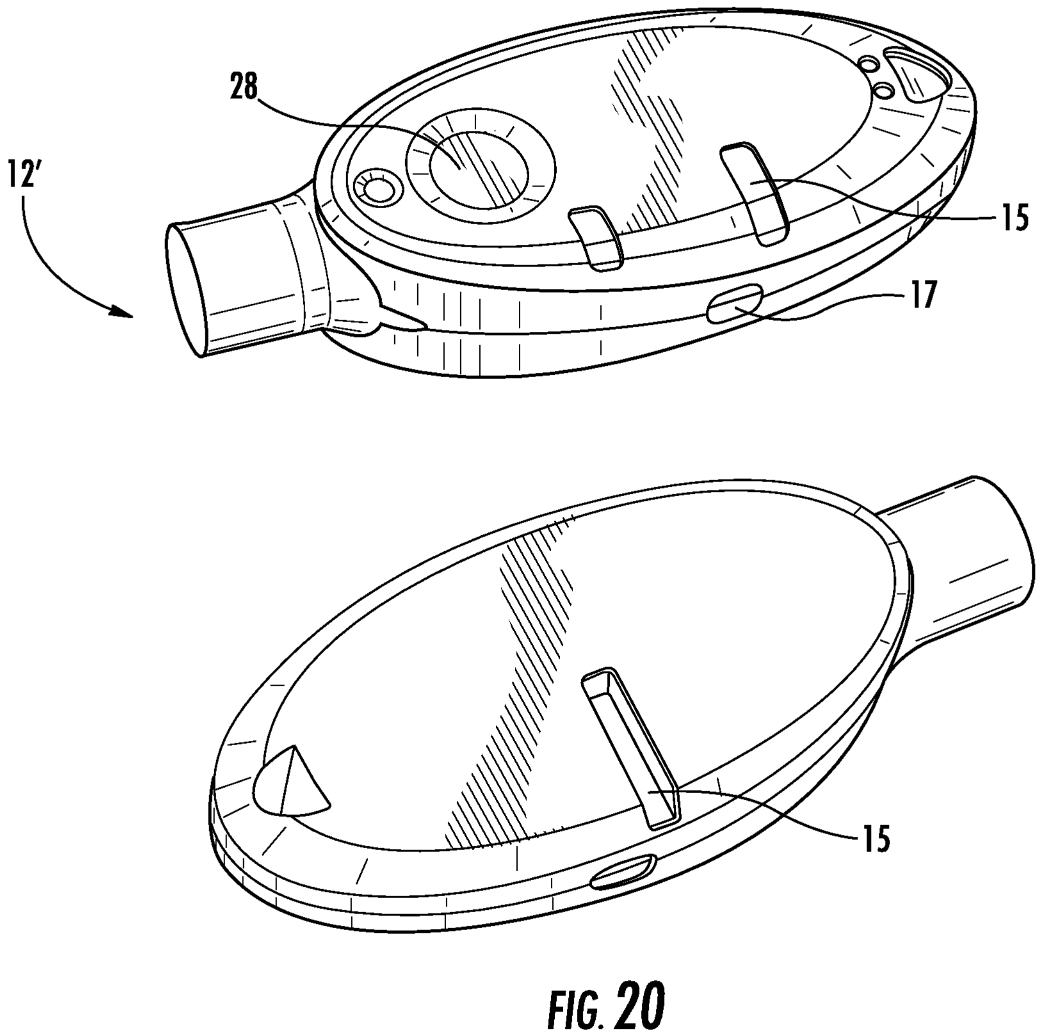
FIG. 20 illustrates top and bottom perspective views of an electronic key according to another embodiment.
Figure 21:
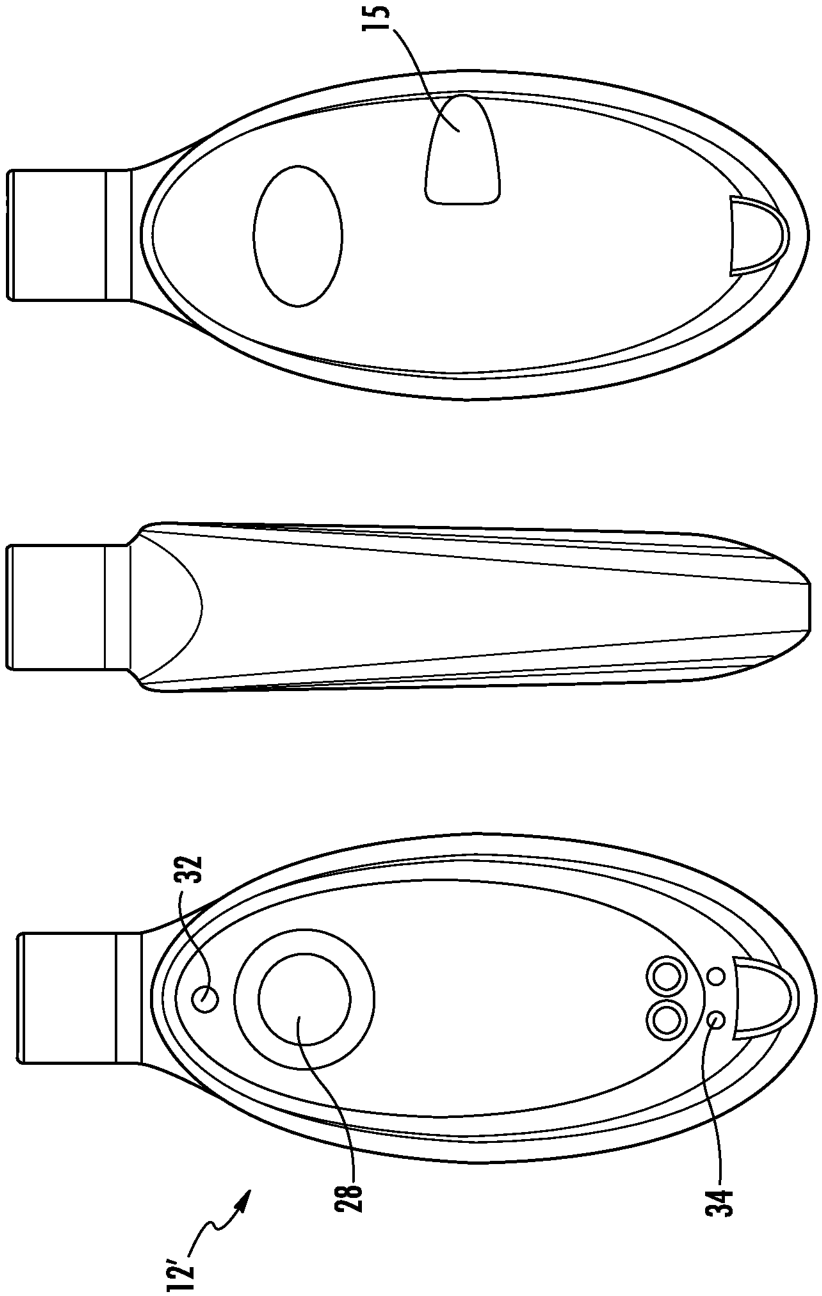
FIG. 21 illustrates plan and side views of the electronic key shown in FIG. 20.

FIGS. 20-21 show additional embodiments of an electronic key 12'. In this embodiment, the electronic key 12' includes one or more alignment features 15 for facilitating alignment with a programming or authorization station 16' and/or a charging station 18' as discussed in further detail below. In addition, the electronic key 12' includes an input port 17 (e.g., a micro-USB port) which may be configured to releasably engage a corresponding port on the programming or authorization station 16' and/or the charging station 18' for data and/or power transfer. Notably in the example shown in FIG. 20, the input port 17 on the electronic key 12' is on a side surface, while a pair of alignment features 15 are provided on opposite surfaces of the electronic key. In the embodiment shown in FIG. 21, a single alignment feature 15 is provided. The input port 17 may be located on a side surface between a transfer port at one end and a key chain ring opening at an opposite end. Positioning of the input port 17 on a side surface of the electronic key 12' may provide for a more secure and stable attachment to the programming or authorization station 16' and/or the charging station 18'. A series of status indicators 32, 34, as discussed above, for example light-emitting diodes (LEDs) may be provided on the exterior of the electronic key 12' for indicating the operating status thereof.

As shown in FIG. 1, the programming station 16 comprises a housing configured to contain the logic control circuit that generates the SDC, the memory that stores the SDC, and a communications system for communicating the SDC to the key (e.g., wirelessly). In use, the logic control circuit generates the SDC, which may be a predetermined (i.e. "factory preset") security code, a manually input security code, or a security code that is randomly generated by the logic control circuit. In the latter instance, the logic control circuit further comprises a random number generator for producing the unique SDC. A series of visual indicators, for example light-emitting diodes (LEDs) may be provided on the exterior of the housing for indicating the operating status of the programming station 16. Programming station 16 may further be provided with an access mechanism for preventing use of the programming station by an unauthorized person. For example, the programming station may include a keypad 44. An authorized user may input a code in the key pad 44 that allows the programming station 16 to generate a SDC for communicating to the key 12.

In a particular embodiment, the logic control circuit of the programming station 16 performs an electronic exchange of data with a logic control circuit of the key, commonly referred to as a "handshake communication protocol." The handshake communication protocol determines whether the key 12 is an authorized key that has not been programmed previously (e.g., a "new" key), or is an authorized key that is being presented to the programming station 16 a subsequent time to refresh the SDC. In the event that the handshake communication protocol fails, the programming station 16 will not provide the SDC to the unauthorized device attempting to obtain the SDC. When the handshake communication protocol succeeds, programming station 16 permits the SDC to be transmitted by the key 12. As will be readily apparent to those skilled in the art, the SDC may be transmitted from the programming station 16 to the key 12 by any suitable means, including without limitation, wireless, electrical contacts or electromechanical, electromagnetic or magnetic conductors, as desired. Moreover, in other cases the programming station 16 may simply provide the SDC to the electronic key 12 without first initiating any handshake communication protocol.

In some embodiments, the merchandise security device 14 is a "passive" device. As used herein, the term passive is intended to mean that the security device 14 does not have an internal power source sufficient to lock and/or unlock a mechanical lock mechanism. Significant cost savings are obtained by a retailer when the merchandise security device 14 is passive since the expense of an internal power source is confined to the key 12, and one such key is able to operate multiple security devices. If desired, the merchandise security device 14 may also be provided with a temporary power source (e.g., capacitor or limited-life battery) having sufficient power to activate an alarm, for example a piezoelectric audible alarm, that is actuated by a sensor, for example a contact, proximity or limit switch, in response to a security breach. The temporary power source may also be sufficient to communicate data, for example a SDC, from the merchandise security device 14 to the key 12 to authenticate the security device and thereby authorize the key to provide power to the security device.

In some embodiments, the merchandise security device 14 further comprises a logic control circuit, similar to the logic control circuit disposed within the key 12, adapted to perform a handshake communication protocol with the logic control circuit of the key in essentially the same manner as that between the programming station 16 and the key. In essence, the logic control circuit of the key 12 and the logic control circuit of the merchandise security device 14 communicate with each other to determine whether the merchandise security device is an authorized device that does not have a security code, or is a device having a matching SDC. In the event the handshake communication protocol fails (e.g., the device is not authorized or the device has a non-matching SDC), the key 12 will not program the device with the SDC, and consequently, the merchandise security device will not operate. If the merchandise security device 14 was previously programmed with a different SDC, the device will no longer communicate with the key 12. In the event the handshake communication protocol is successful, the key 12 permits the SDC stored in the key to be transmitted to the merchandise security device 14 to program the device with the SDC. As will be readily apparent to those skilled in the art, the SDC may be transmitted from the key 12 to the merchandise security device 14 by any suitable means, including without limitation, via radiofrequency, one or more electrical contacts, electromechanical, electromagnetic or magnetic conductors, as desired. Furthermore, the SDC may be transmitted by inductive transfer of data from the electronic key 12 to the merchandise security device 14. Moreover, in other cases the electronic key 12 may simply provide the SDC to the merchandise security device 14 without first initiating any handshake communication protocol.

In one embodiment, when the handshake communication protocol is successful and the merchandise security device 14 is an authorized device having the matching SDC, the merchandise security device may be armed or disarmed, such as where the security device includes an alarm circuit. In other embodiments, the merchandise security device 14 may be armed or disarmed when the SDC codes match. In some embodiments, when the handshake communication protocol is successful and the SDC codes match, the logic control circuit of the key 12 causes an internal power source of the key to transfer electrical power to the device 14 to operate a mechanical lock mechanism. In other embodiments, the merchandise security device 14 may be locked or unlocked when the SDC codes match and power is transferred to the merchandise security device. It is understood that various information and codes may be exchanged in order to perform the desired function, such as arming, disarming, locking, or unlocking the merchandise security device 14. For example, the data exchanged may include a serial number of the merchandise security device alone and/or an SDC.

Figure 11:
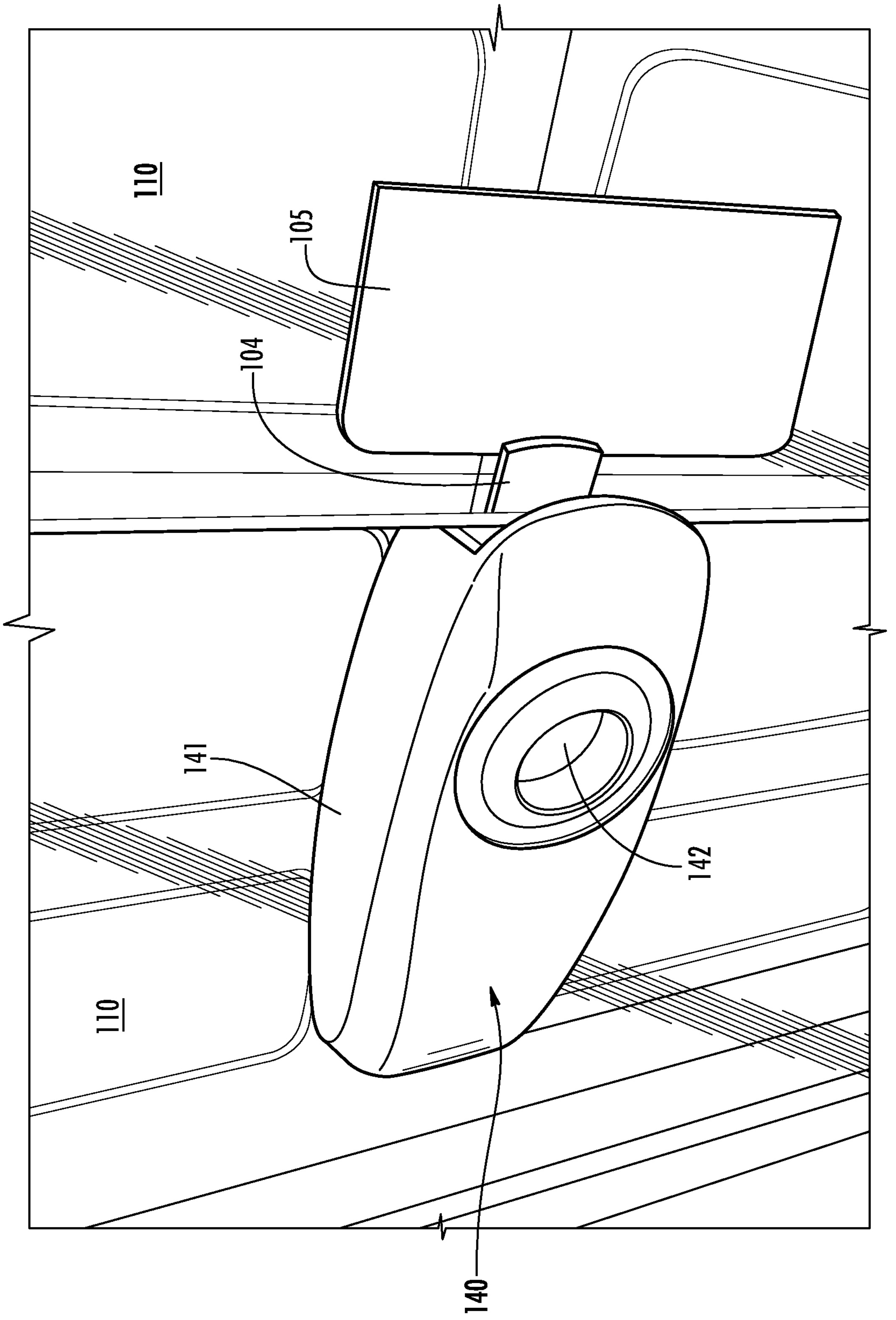
FIG. 11 is a perspective view of a merchandise security device according to one embodiment.

FIG. 11 shows one embodiment of a merchandise security device 140 in greater detail. As previously mentioned, the merchandise security device 14 can be any type of security device that utilizes an alarm circuit and/or a lock mechanism that locks and/or unlocks a lock. In some cases, the merchandise security device 140 may be a passive device in the sense that it does not have an internal power source sufficient to operate a lock mechanism. As a result, the merchandise security device 140 may be configured to receive power, or alternatively, both power and data, from an external source, such as the electronic key 12 shown and described herein. The embodiment of the merchandise security device depicted in FIG. 11 is a cabinet lock configured to be securely affixed to the locking arm 104 of a conventional cabinet lock bracket 105. As previously described, the cabinet lock 140 may include a logic control circuit for performing a handshake communication protocol with the logic control circuit of the key 12 and for receiving the SDC from the key. In other embodiments, the cabinet lock 140 may be configured to transmit the SDC to the key 12 to authenticate the security device and thereby authorize the key to transfer power to the security device.

Figure 12:
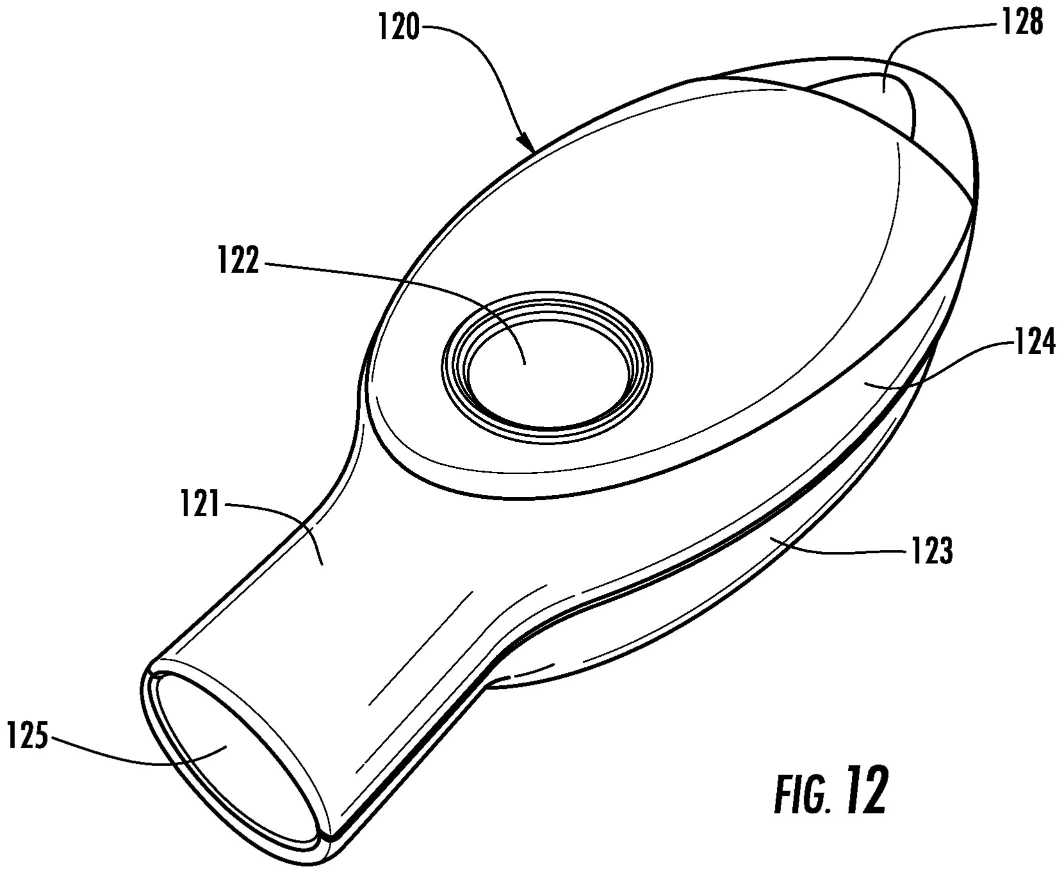
FIG. 12 is a perspective view of an electronic key according to one embodiment.

FIG. 12 show an embodiment of an electronic key 120 with inductive transfer in greater detail. As previously mentioned, the key 120 may be configured to transfer both data and power to a merchandise security device 140. Accordingly, the programmable electronic key 120 may be an active device in the sense that it has an internal power source sufficient to operate a mechanical lock mechanism of the merchandise security device 140. As a result, the programmable electronic key 120 may be configured to transfer both data and power from an internal source, such as a logic control circuit (e.g., data) and a battery (e.g., power) disposed within the key. The embodiment of the programmable electronic key 120 depicted herein is a key with inductive transfer capability configured to be received within the transfer port 145 of the cabinet lock 140 shown in FIG. 11, as well as a programming port 46 of the programming station and the charging port 30 of the charging station.

In some embodiments, the electronic key 120 comprises a housing 121 having an internal cavity or compartment that contains the internal components of the key, including without limitation the logic control circuit, memory, communication system and battery, as will be described. As shown, the housing 121 is formed by a lower portion 123 and an upper portion 124 that are joined together after assembly, for example by ultrasonic welding. The electronic key 120 further defines an opening 128 at one end for coupling the key to a key chain ring, lanyard or the like. The electronic key 120 may further comprise a transfer probe 125 located at an end of the housing 121 opposite the opening 128 for transferring data and/or power to the merchandise security device 140. The transfer probe 125 is also operable to transmit and receive a handshake communication protocol and the SDC from the programming station 16, as previously described, and to receive power from a charging station.

Figure 13:
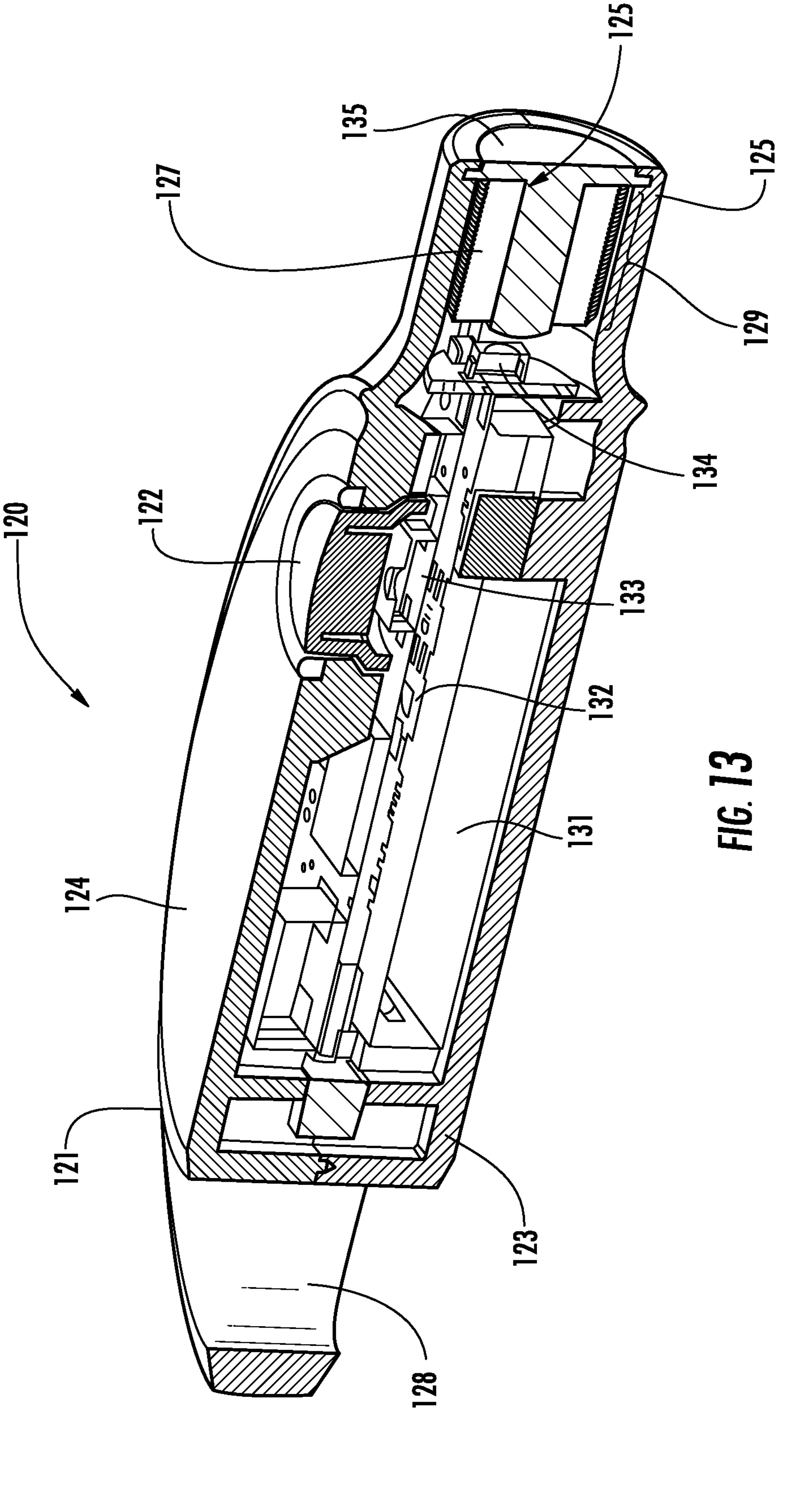
FIG. 13 is a cross-sectional view of the electronic key shown in FIG. 12.

As best shown in FIG. 13, an internal battery 131 and a logic control circuit, or printed circuit board (PCB) 132 are disposed within the housing 121 of the electronic key 120. Battery 131 may be a conventional extended-life replaceable battery or a rechargeable battery suitable for use with the charging station 18. The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of the data and/or power. In that regard, the logic control circuit 132 is further operatively coupled and electrically connected to a communication system 134 for transferring data and/or power. In one embodiment, the communication system 134 is a wireless infrared (IR) transceiver for optical transmission of data between the electronic key 120 and the programming station, and between the key and the merchandise security device 140. As a result, the transfer probe 125 of the key 120 may be provided with an optically transparent or translucent filter window 135 for emitting and collecting optical transmissions between the key 120 and the programming station 60, or between the key and the merchandise security device 140, as required. Transfer probe 125 may further comprise an inductive core 127 and inductive core windings 129 for transferring electrical power to the merchandise security device 140 and/or receiving electrical power from the charging station 18 to charge the internal battery 131, as required. Alternatively, the optical transceiver 134 may be eliminated and data transferred between the programmable electronic key 120 and the merchandise security device 140 via magnetic induction through the inductive coil 126.

In some embodiments, an important aspect of an electronic key 120, especially when used for use in conjunction with a merchandise security device 140 as described herein, is that the key does not require a physical force to be exerted by a user on the key to operate the mechanical lock mechanism of the merchandise security device. By extension, no physical force is exerted by the key 120 on the mechanical lock mechanism. As a result, the key 120 cannot be unintentionally broken off in the lock, as often occurs with conventional mechanical key and lock mechanisms. Furthermore, neither the key 120 nor and the mechanical lock mechanism suffer from excessive wear as likewise often occurs with conventional mechanical key and lock mechanisms. In addition, in some cases there is no required orientation of the transfer probe 125 of the electronic key 120 relative to the ports on any one of the programming station, charging station, and/or the merchandise security device 140. Accordingly, any wear of the electrical contacts on the transfer probe 125 and ports may be minimized. As a further advantage in some embodiments, an authorized person is not required to position the transfer probe 125 of the electronic key 120 in a particular orientation relative to the transfer port 142 of the merchandise security device 140 and thereafter exert a compressive and/or torsional force on the key to operate the mechanical lock mechanism of the device.

Figure 22:
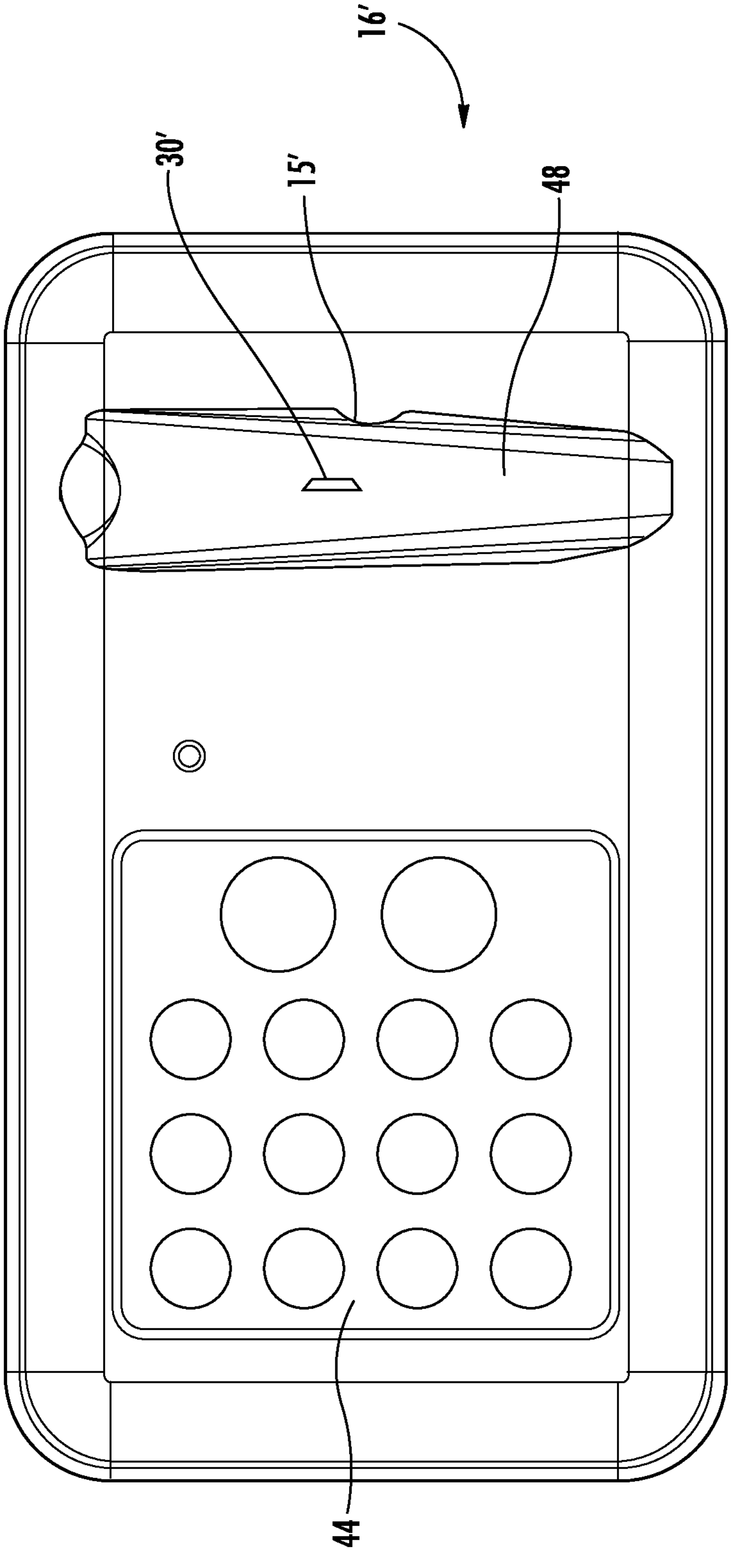
FIG. 22 is a plan view of a programming or authorization station according to one embodiment.
Figure 23:
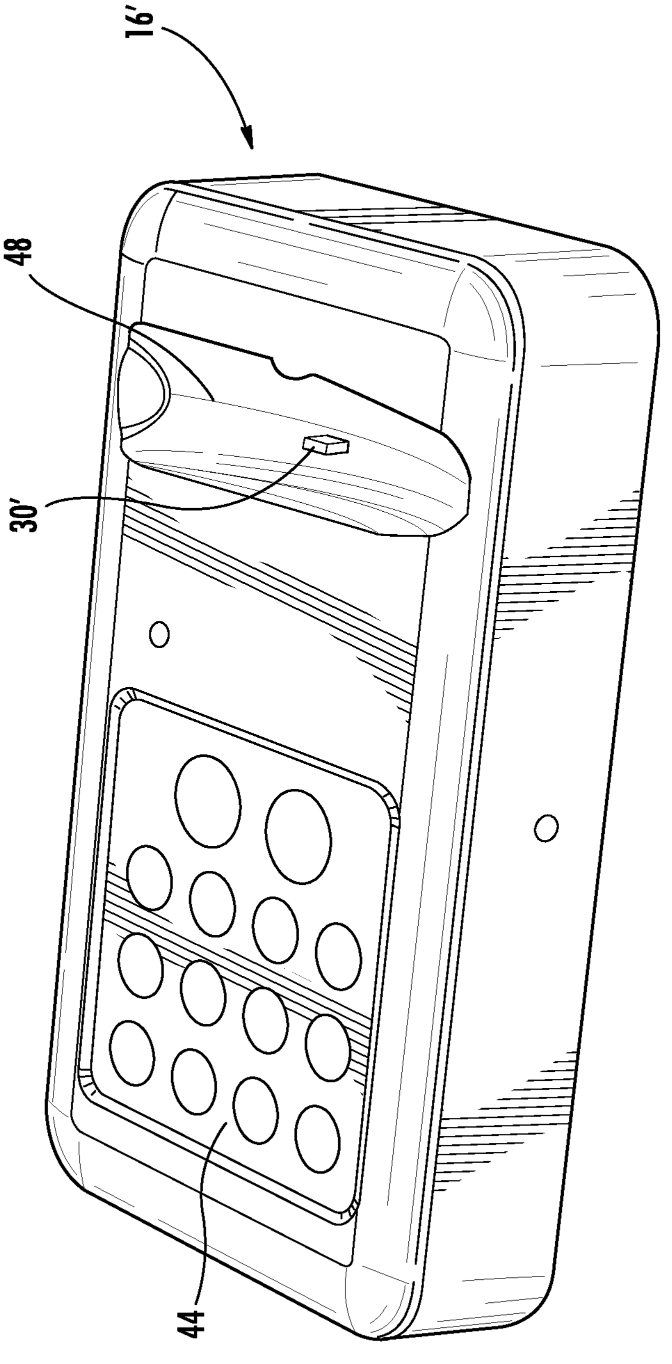
FIG. 23 is a perspective view of the programming or authorization station shown in FIG. 22.
Figure 24:
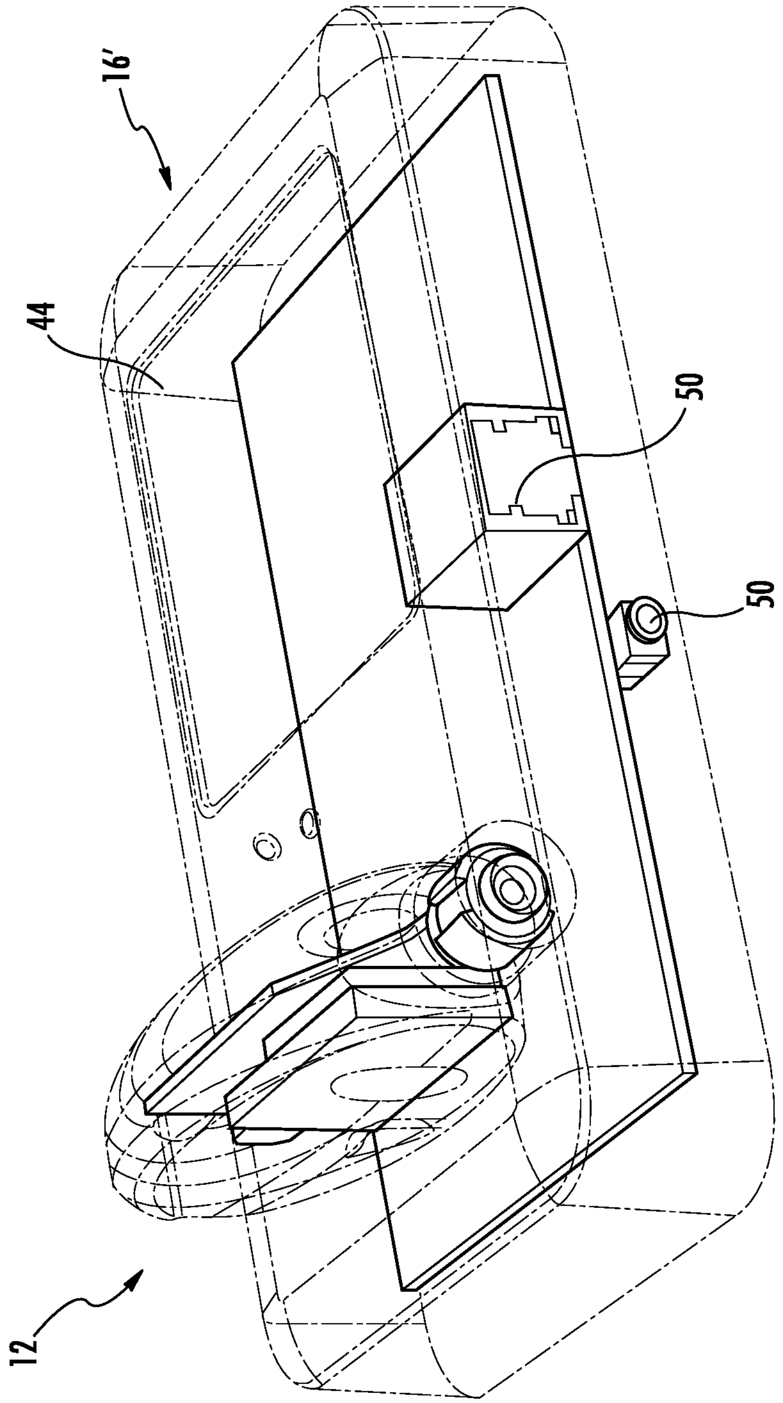
FIG. 24 is another perspective view of the programming or authorization station shown in FIG. 22.

FIGS. 22-24 illustrate an embodiment of a programming or authorization station 16'. As illustrated, the programming or authorization station 16' includes a geometry for receiving the electronic key 12' as discussed above (see, e.g., FIG. 21). In this regard, the programming or authorization station 16' may include one or more alignment features 15' configured to align with and engage alignment feature 15 of the electronic key 12'. Moreover, the programming or authorization station 16' may further define a recess 48 for at least partially receiving a side surface of the electronic key 12'. The recess 48 may be curved or any other shape for corresponding to the shape of the electronic key 12'. Within the recess 48, the programming or authorization station 16' may include a port 30' for releasably engaging the input port 17 of the electronic key 12'. The alignment features 15, 15' are configured to align with one another to ensure that the input port 17 and port 30' align with and engage one another. Such engagement may allow for data communication between the electronic key 12' and the programming or authorization station 16', which may occur in some cases, upon entry of an authorized code using keypad 44. In addition, the programming or authorization station 16' may include one or more input ports 50 for receiving power and data communication (e.g., an Ethernet port).

FIG. 1 shows a charging station 18 in greater detail. As previously mentioned, the charging station 18 recharges the internal battery 131 of the key 12. In certain instances, the charging station 18 also deactivates the data transfer and/or power transfer capability of the key 12 until the key has been reprogrammed with the SDC by the programming station 16 or the user provides an authorized code to the charging station. Regardless, the charging station 18 comprises a housing for containing the internal components of the charging station. The exterior of the housing has at least one, and preferably, a plurality of charging ports 30 formed therein that are sized and shaped to receive the electronic key 12 (see, e.g., FIG. 1). Mechanical or magnetic means may be provided for properly positioning and securely retaining the key 12 within the charging port 18 for ensuring proper power transfer.

Figure 16:
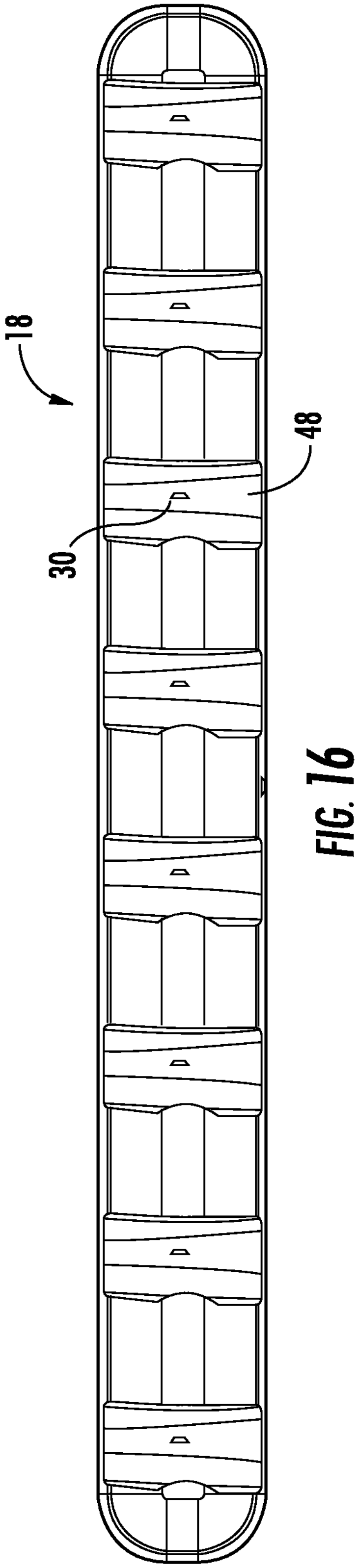
FIG. 16 is a plan view of a charging station according to one embodiment.
Figure 17:
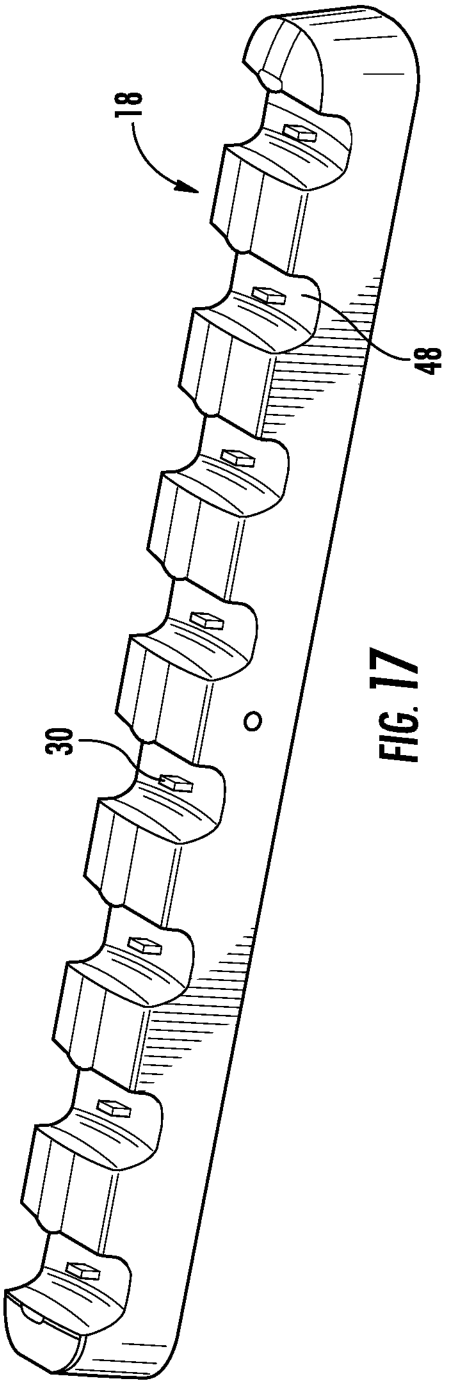
FIG. 17 is a perspective view of the charging station shown in FIG. 16.
Figure 18:
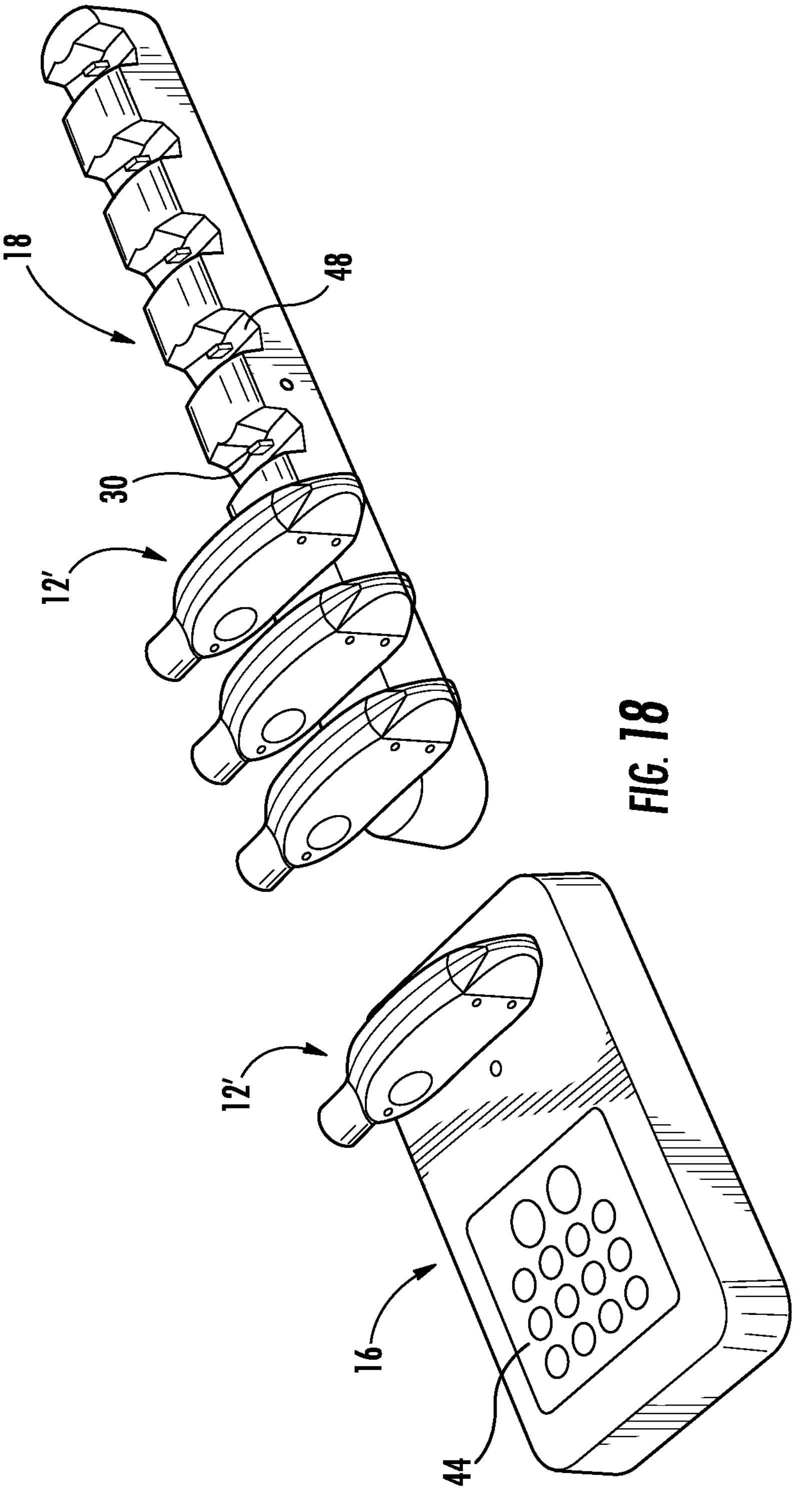
FIG. 18 illustrates a merchandise security system according to one embodiment.

FIGS. 16-18 show an embodiment of a charging station 18 wherein a plurality of ports 30 are provided for engagement with a plurality of corresponding electronic keys 12'. The electronic key 12' shown in FIG. 21 may be compatible with the charging station 18 shown in FIGS. 16-18 whereby the electronic key 12' includes an input port 17 on its side for engagement with the port 30, similar to that described in conjunction with programming or authorization station 16'. Likewise, each port 30 may be located within a respective recess 48 for receiving at least a side surface of the electronic key 12'. This arrangement may allow for a greater number of electronic keys 12' to be engaged with the charging station 18 at any one time.

Figure 14:
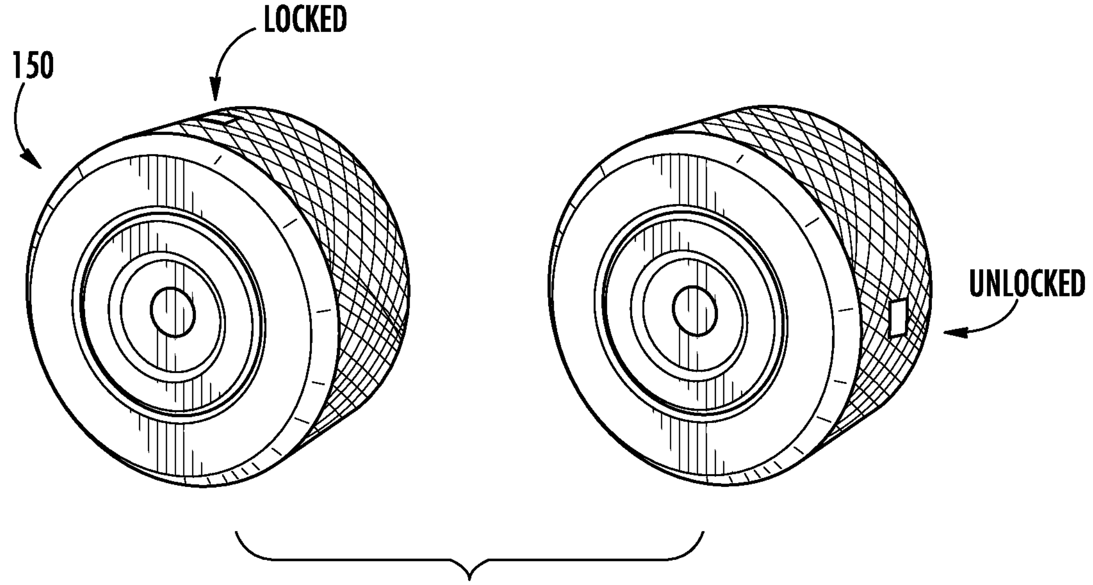
FIG. 14 is a perspective view of a merchandise security device in a locked and unlocked position according to one embodiment.
Figure 15:
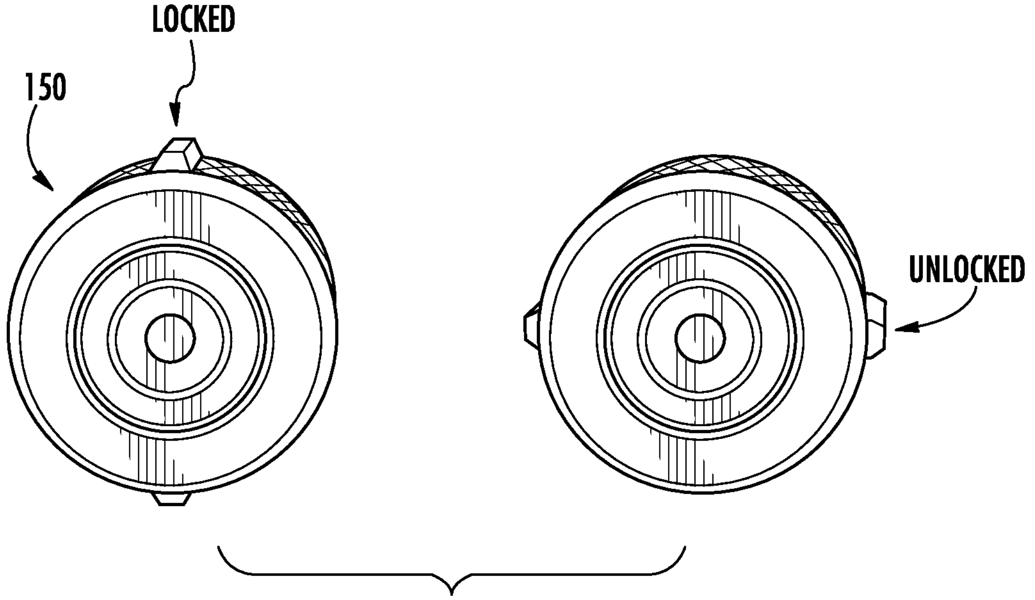
FIG. 15 is a perspective view of a merchandise security device in a locked and unlocked position according to another embodiment.

FIGS. 14-15 show additional embodiments of a merchandise security device 150. In this embodiment, the merchandise security device 150 comprises a lock mechanism that utilizes "energy harvesting". Thus, the merchandise security device 150 may be a passive device as described above. However, in this embodiment, the merchandise security device 150 includes means for generating power to be stored. For example, the merchandise security device 150 may be configured to rotate between locked and unlocked positions and include a generator configured to generate energy to be stored (e.g., via a capacitor). In some cases, the merchandise security device 150 may include a bezel and each turn of the bezel may generate an electrical charge to be stored. In one embodiment, the electronic key 12 may be used initially to disengage a mechanical lock, and then the merchandise security device 150 may be rotated to an unlocked position. The merchandise security device 150 may then be rotated back to the locked position. Since the merchandise security device 150 has no power source, the security device is capable of performing various security functions using the stored power. For instance, the merchandise security device 150 may be configured to use the stored power to push data to one or more nodes 20 or to generate audible and/or visible signals. In one example, the merchandise security device 150 may include an internal radio for transmitting wireless signals using the stored power, such as for generating a distress signal when the security device is tampered with. In another example, the merchandise security device 150 may include a light-emitting device (LED) that is powered by the stored power. In some embodiments, techniques for energy harvesting may be similar to that described in U.S. application Ser. No. 13/538,386, the disclosure of which is incorporated by reference in its entirety.

The foregoing has described one or more exemplary embodiments of a merchandise display security system. Embodiments of a merchandise display security system have been shown and described herein for purposes of illustrating and enabling one of ordinary skill in the art to make, use and practice the invention. Those of ordinary skill in the art, however, will readily understand and appreciate that numerous variations and modifications of the invention may be made without departing from the spirit and scope thereof. Accordingly, all such variations and modifications are intended to be encompassed by the appended claims.

That which is claimed is:

1. A security system comprising:

a plurality of security devices in a wireless network, the plurality of security devices arranged in a planogram and each configured to protect one or more items from theft, each of the plurality of security devices configured to wirelessly communicate data, each of the plurality of security devices storing an identifier for uniquely identifying the security device;

a plurality of electronic keys configured to communicate with the plurality of security devices for obtaining the identifiers of the plurality of security devices, each of the plurality of electronic keys storing a security code and one or more identifiers for the plurality of security devices assigned to the electronic key, wherein any one of the plurality of electronic keys is configured to unlock or disarm any one of the plurality of security devices if the identifier obtained by the electronic key matches the identifier assigned to the electronic key and if the electronic key determines that the security code is authenticated; and a gateway configured to receive the data from each of the plurality of security devices via wireless communication, wherein the gateway is configured to communicate the data to a computing device, wherein each of the plurality of security devices is configured to receive a command from the computing device for controlling the security device.

2. The security system of claim 1, wherein the gateway is configured to communicate with the computing device via a cloud network.

3. The security system of claim 1, wherein the data further comprises a type of the items.

4. The security system of claim 1, wherein the items are items of merchandise located in a retail store.

5. The security system of claim 1, wherein the data further comprises a system health of the items.

6. The security system of claim 1, wherein the data further comprises a system health of the plurality of security devices.

7. The security system of claim 1, wherein the plurality of security devices are locks or alarming security displays.

8. The security system of claim 1, wherein the plurality of security devices are locks and alarming security displays.

9. The security system of claim 1, wherein the plurality of security devices comprise different types.

10. The security system of claim 1, wherein the identifier of each of the plurality of security devices is a serial number.

11. The security system of claim 1, wherein at least one of the plurality of electronic keys is configured to be authorized for locking, unlocking, arming, or disarming one or more of the plurality of security devices.

12. The security system of claim 1, wherein the gateway is configured to communicate data to the computing device comprising a date and time of activation of each electronic key, a user of each electronic key, a serial number of each electronic key, a number of activations of each electronic key, or events resulting from activation of each electronic key.

13. The security system of claim 1, wherein at least one of the plurality of electronic keys is configured to be authorized for locking, unlocking, arming, or disarming one or more different security devices than at least one other electronic key.

14. The security system of claim 1, wherein each of the plurality of electronic keys is configured to receive a command from the computing device for controlling the electronic key.

15. The security system of claim 1, wherein each of the plurality of electronic keys comprises a serial number.

16. The security system of claim 15, wherein the gateway is configured to communicate the serial numbers to the computing device.

17. The security system of claim 15, wherein one of the plurality of electronic keys is configured to communicate with one of the plurality of security devices for locking, unlocking, arming, or disarming the security device based on the serial number.

18. The security system of claim 1, wherein each of the plurality of electronic keys is configured to receive the data from the plurality of security devices for communicating the data to the computing device.

19. The security system of claim 1, wherein each of the plurality of electronic keys is configured to receive a command from the computing device for disabling each of the electronic keys.

20. The security system of claim 1, wherein the gateway is configured to automatically communicate the data and information regarding the planogram to the computing device.

21. The security device of claim 1, wherein the planogram represents a layout of the plurality of security devices within a retail store, and wherein information regarding the planogram comprises serial numbers of the security devices mapped to the layout.

22. The security device of claim 1, wherein the gateway is configured to communicate the data and information regarding the planogram to the computing device for auditing the plurality of security devices.

23. The security device of claim 1, wherein the gateway is configured to communicate the data and information regarding the planogram to the computing device for monitoring the plurality of security devices.

24. The security device of claim 1, wherein the computing device is a tablet or a computer.

25. The security system of claim 1, wherein each of the plurality of security devices is configured to receive a command from the computing device for locking one or more of the security devices.

26. The security device of claim 1, wherein the gateway is configured to communicate the data and information regarding the planogram to a plurality of computing devices.

27. The security device of claim 1, wherein the computing device is configured to control each of the plurality of security devices from a remote location.

28. The security system of claim 1, wherein each of the plurality of security devices is configured to receive a single command from the computing device for locking all of the security devices in response to a theft event.

29. The security device of claim 1, wherein each of the plurality of electronic keys is configured to store a plurality of identifiers for the plurality of security devices assigned to the electronic key.

30. The security device of claim 1, wherein the electronic key is configured to determine that the security code stored by the electronic key is authenticated based on a security code provided by the security device to the electronic key.

31. The security device of claim 1, wherein the electronic key is configured to determine that the security code is authenticated based on a handshake communication protocol with the security device.

32. A method for protecting items from theft, the method comprising:

a plurality of security devices in a wireless network, the plurality of security devices arranged in a planogram and each configured to protect one or more items from theft;

a plurality of electronic keys;

each of the plurality of security devices wirelessly communicating data, each of the plurality of security devices storing an identifier for uniquely identifying the security device;

a gateway wirelessly receiving the data;

the gateway wirelessly communicating the data to a computing device;

each of the plurality of electronic keys communicating with the plurality of security devices for obtaining the identifiers of the plurality of security devices, each of the plurality of electronic keys storing a security code and one or more identifiers for the plurality of security devices assigned to the electronic key, any one of the plurality of electronic keys unlocks or disarms any one of the plurality of security devices if the identifier obtained by the electronic key matches the identifier assigned to the electronic key and if the electronic key determines that the security code is authenticated; and each of the plurality of security devices receiving a command from the computing device for controlling the security device.

33. A security system comprising:

a plurality of locks in a wireless network, the plurality of locks each configured to prevent one or more items from being removed from a cabinet, each of the plurality of locks storing an identifier for uniquely identifying the lock; and a plurality of electronic keys configured to communicate with the plurality of locks for obtaining the identifiers of the plurality of locks, each of the plurality of electronic keys storing a security code and a plurality of identifiers for the plurality of locks assigned to the electronic key, wherein any one of the plurality of electronic keys is configured to unlock any one of the plurality of locks if the identifier obtained by the electronic key matches the identifier assigned to the electronic key and if the electronic key determines that the security code is authenticated.

34. The security system of claim 1, wherein each of the plurality of security devices is configured to be attached to a respective one of the items.

35. The security system of claim 33, wherein each of the plurality of locks are cabinet locks configured to secure a plurality of items within a respective cabinet.

* * * * *